(12) United States Patent
Terrell et al.

(10) Patent No.: US 12,373,872 B2
(45) Date of Patent: *Jul. 29, 2025

(54) SYSTEM, METHOD, AND APPARATUS FOR A DIGITAL COLLECTIBLE PLATFORM

(71) Applicant: All-Stars IP, LLC, Dallas, TX (US)

(72) Inventors: Scott Terrell, McKinney, TX (US); Lucien B. Crosland, Dallas, TX (US); Chad Meyer, Florence, TX (US); John A. Scully, Dallas, TX (US)

(73) Assignee: ALL-STARS IP, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/583,537

(22) Filed: Feb. 21, 2024

(65) Prior Publication Data

US 2024/0193661 A1    Jun. 13, 2024

Related U.S. Application Data

(63) Continuation-in-part of application No. 18/091,769, filed on Dec. 30, 2022, which is a
(Continued)

(51) Int. Cl.
*G06Q 30/0601*    (2023.01)
*G06K 19/04*    (2006.01)
*G06Q 50/00*    (2024.01)

(52) U.S. Cl.
CPC ....... *G06Q 30/0627* (2013.01); *G06K 19/041* (2013.01); *G06Q 30/0643* (2013.01); *G06Q 50/01* (2013.01)

(58) Field of Classification Search
CPC ........... G06Q 30/0627; G06Q 30/0643; G06Q 50/01; G06K 19/041
(Continued)

(56) References Cited

U.S. PATENT DOCUMENTS

2004/0209691 A1    10/2004    Roush
2015/0141141 A1*    5/2015    Suzuki .................... A63F 13/80
463/31
(Continued)

OTHER PUBLICATIONS

Invaluable, How to Determine Your Football Cards' Value, 2018 (Year: 2018).*
(Continued)

*Primary Examiner* — Tarek Elchanti
(74) *Attorney, Agent, or Firm* — DITTHAVONG, STEINER, & MLOTKOWSKI

(57) ABSTRACT

An approach is provided for a digital collectible platform. The platform or system includes a physical tag configured with a machine readable code associated with an object (e.g., a collectible object). The platform also includes a code reader configured to read the machine readable code from the physical tag to determine an object identifier associated with the object. The platform further includes a processor configured to compute a dynamic value metric based on attribute data records associated with the object identifier. The dynamic value metric is updated based on automatic monitoring of the attribute data to determine that a change to the attribute data has occurred. The platform also includes an application configured to present a user interface displaying a digital representation of the object comprising the dynamic value metric.

18 Claims, 21 Drawing Sheets

Related U.S. Application Data continuation-in-part of application No. 17/946,745, filed on Sep. 16, 2022, now Pat. No. 11,830,087.

(58) Field of Classification Search
USPC .............................. 705/26.63, 14.26; 463/31
See application file for complete search history.

(56) References Cited

U.S. PATENT DOCUMENTS

| | | |
|---|---|---|
| 2016/0147434 A1 | 5/2016 | Lee et al. |
| 2016/0361642 A1* | 12/2016 | Linden ..................... A63F 1/02 |
| 2017/0213265 A1* | 7/2017 | Masherah .......... H04N 1/00018 |
| 2018/0204060 A1 | 7/2018 | Merchant et al. |
| 2020/0412831 A1 | 12/2020 | Harrison et al. |

OTHER PUBLICATIONS

Lehman, "QR Codes bring sports memorabilia to life in a spectacular way", Dec. 4, 2019, 6 pages.
Adobe express, "Trade cutome-made with Adobe Express", 2021, 3 pages.

* cited by examiner

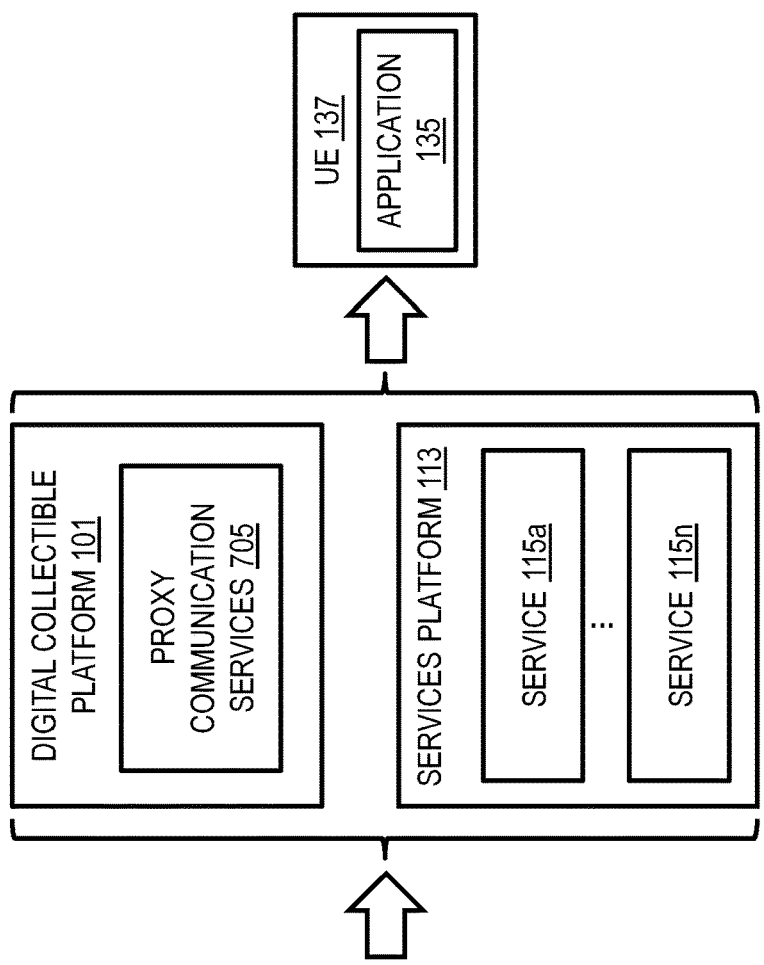
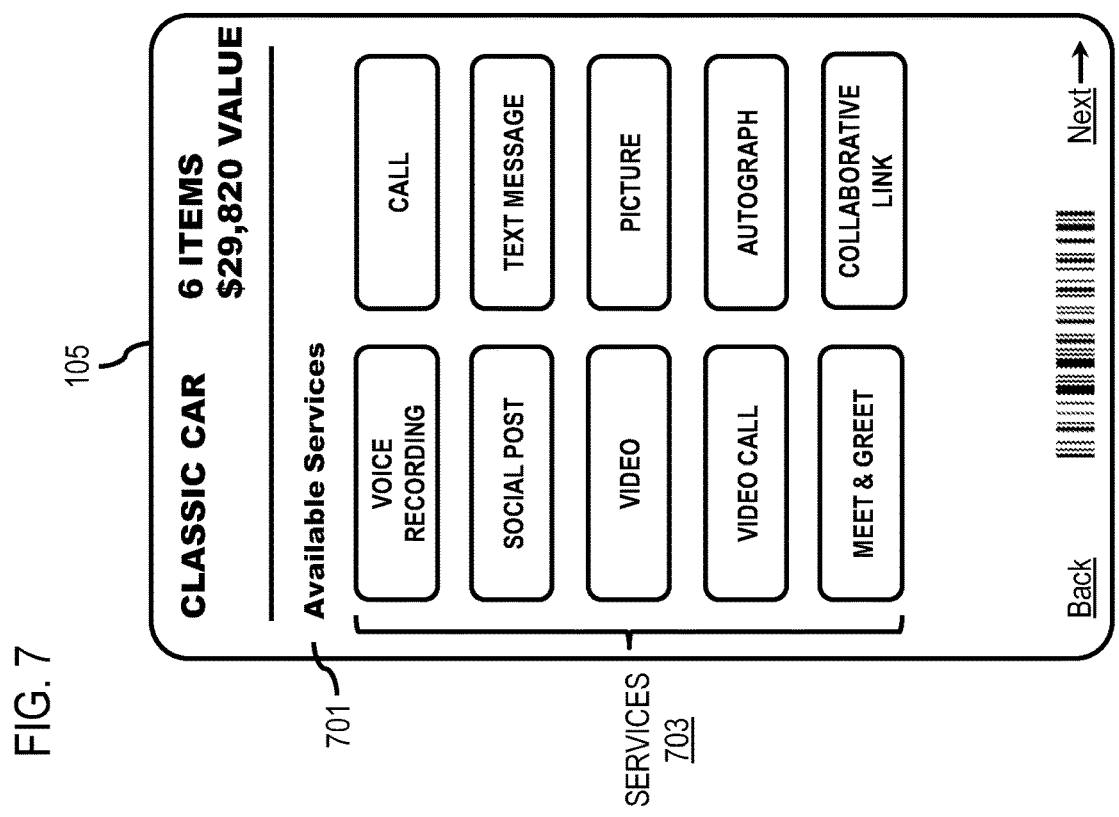
FIG. 7

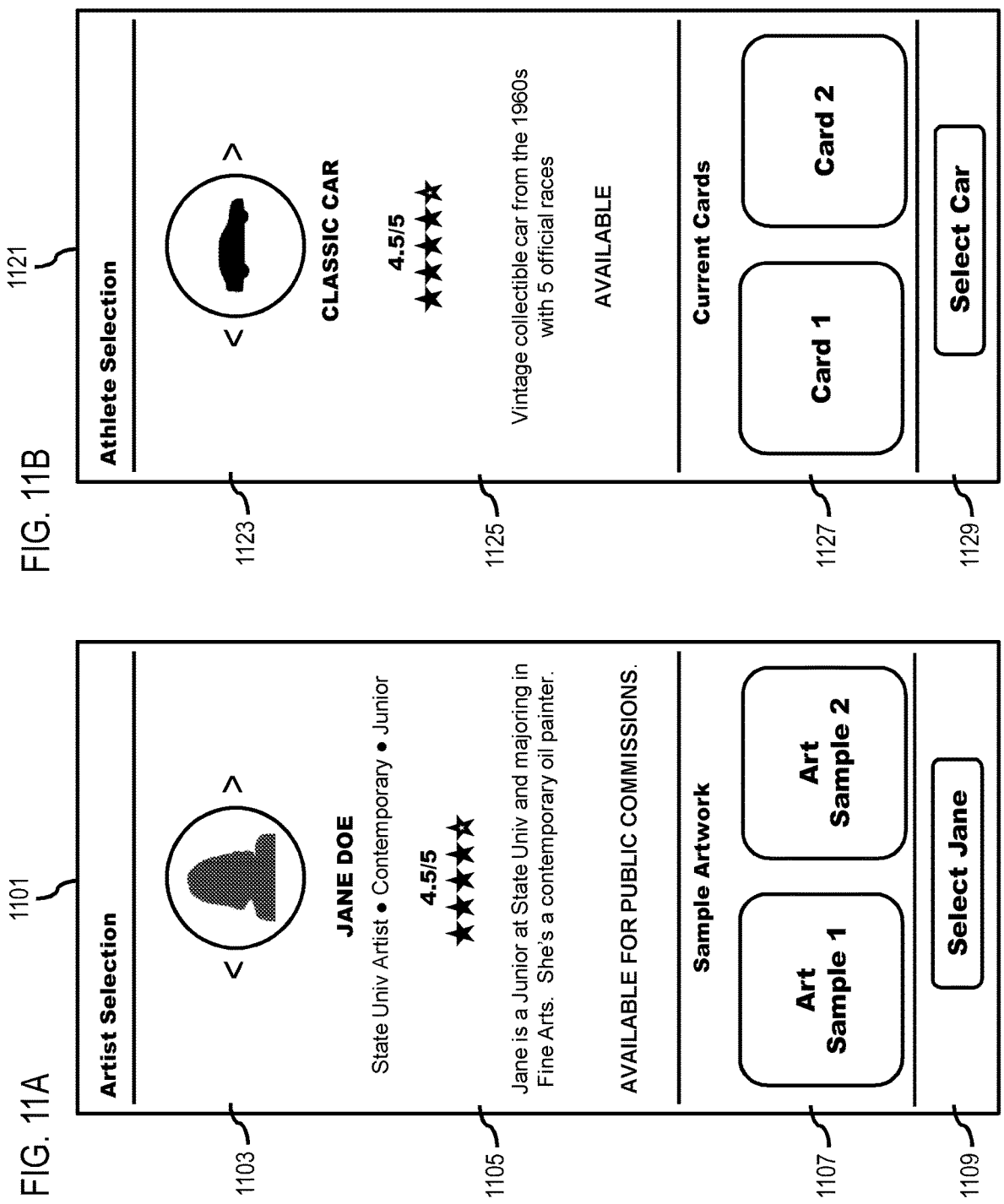

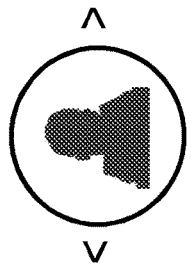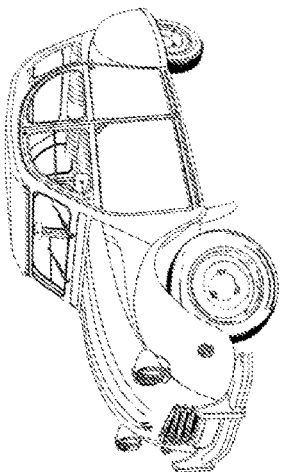
FIG. 11C

SYSTEM, METHOD, AND APPARATUS FOR A DIGITAL COLLECTIBLE PLATFORM

RELATED APPLICATION

This application is a continuation-in-part of and claims priority from U.S. application Ser. No. 18/091,769, entitled "System, Method, And Apparatus for a Digital Trading Card Platform," filed Dec. 30, 2022, which is a continuation-in-part of and claims priority from U.S. application Ser. No. 17/946,745 (now U.S. Pat. No. 11,830,087), entitled "System, Method, And Apparatus for a Digital Trading Card Platform," filed on Sep. 16, 2022, the contents of which are hereby incorporated by reference herein in their entireties.

BACKGROUND

Traditionally, collectible items or objects (e.g., trading cards or any other objects that are valued and sought after by collector) have been static with little dynamic engagement or interaction between collectible objects and collectors beyond merely possessing the collectible items or objects. As a result, service providers face significant technical challenges with respect to integrating interactive technologies in the traditionally non-digital domain of collectible items or objects.

SOME EXAMPLE EMBODIMENTS

Therefore, there is a need for a collectible platform that offers technical solutions to managing digital engagements and/or interactions between collectible objects and associated stakeholders (e.g., collectors, consumers, sponsors, etc.).

According to one embodiment, a system comprises a physical tag configured with a machine readable code. The machine readable code, for instance, associates the physical tag to an object. The system also comprises a code reader configured to read the machine readable code from the physical tag to determine an object identifier associated with the object. The system further comprises a processor configured to compute a dynamic value metric based on attribute data associated with the object identifier. The dynamic value metric is updated based on automatic monitoring of the attribute data by the processor to determine that one or more changes to the attribute data has occurred. The system further comprises an application configured to present a user interface displaying a digital representation of the object comprising the dynamic value metric.

According to one embodiment, a method comprises initiating a reading of a machine readable code from a physical tag that is affixed to an object to determine an object identifier. The method also comprises querying for one or more attribute data records associated with the object based on the object identifier. The method further comprises computing a dynamic value metric based on the one or more attribute data records. The method further comprises presenting a user interface displaying a digital representation of the object, the one or more attribute data records, the dynamic value metric, or a combination thereof. In one embodiment, the method further comprises determining content associated with the object (e.g., social media feeds, social media communities, collaborative links, associated tasks, or any other content affecting the dynamic value of an item or object, etc.), retrieving the content from one or more content management systems, and displaying the content in the user interface (e.g., within or otherwise associated with the digital representation of the object in the user interface).

According to another embodiment, an apparatus comprises at least one processor, and at least one memory including computer program code for one or more computer programs, the at least one memory and the computer program code configured to, with the at least one processor, cause, at least in part, the apparatus to initiate a reading of a machine readable code from a physical tag that is affixed to an object to determine an object identifier. The apparatus is also caused to query for one or more attribute data records associated with the object based on the object identifier. The apparatus is further caused to compute a dynamic value metric based on the one or more attribute data records. The apparatus is further caused to present a user interface displaying a digital representation of the object, the one or more attribute data records, the dynamic value metric, or a combination thereof. In one embodiment, the apparatus is further caused to determine content associated with the object (e.g., social media feeds, social media communities, collaborative links, associated tasks, or any other content affecting the dynamic value of an item or object, etc.), retrieve the content from one or more content management systems, and display the content in the user interface (e.g., within or otherwise associated with the digital representation of the object in the user interface).

According to another embodiment, a non-transitory computer-readable storage medium carries one or more sequences of one or more instructions which, when executed by one or more processors, cause, at least in part, an apparatus to initiate a reading of a machine readable code from a physical tag that is affixed to an object to determine an object identifier. The apparatus is also caused to query for one or more attribute data records associated with the object based on the object identifier. The apparatus is further caused to compute a dynamic value metric based on the one or more attribute data records. The apparatus is further caused to present a user interface displaying a digital representation of the object, the one or more attribute data records, the dynamic value metric, or a combination thereof. In one embodiment, the apparatus is further caused to determine content associated with the object (e.g., social media feeds, social media communities, collaborative links, associated tasks, or any other content affecting the dynamic value of an item or object, etc.), retrieve the content from one or more content management systems, and display the content in the user interface (e.g., within or otherwise associated with the digital representation of the object in the user interface).

According to another embodiment, an apparatus comprises means for initiating a reading of a machine readable code from a physical tag that is affixed to an object to determine an object identifier. The apparatus also comprises means for querying for one or more attribute data records associated with the object based on the object identifier. The apparatus further comprises means for computing a dynamic value metric based on the one or more attribute data records. The apparatus further comprises means for presenting a user interface displaying a digital representation of the object, the one or more attribute data records, the dynamic value metric, or a combination thereof. In one embodiment, the apparatus further comprises means for determining content associated with the object (e.g., social media feeds, social media communities, collaborative links, associated tasks, or any other content affecting the dynamic value of an item or object, etc.), retrieving the content from one or more content management systems, and displaying the content in the user interface (e.g., within or otherwise associated with the digital representation of the object in the user interface).

In addition, for various example embodiments described herein, the following is applicable: a computer program product may be provided. For example, a computer program product comprising instructions which, when the program is executed by a computer, cause the computer to perform any one or any combination of methods (or processes) disclosed.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 is a diagram illustrating an example a digital representation of an object listing available services, according to one example embodiment;

FIGS. 11A-11C are diagrams illustrating example user interfaces for selecting an object and/or artist for creating a digital representation of an object, according to one example embodiment;

DESCRIPTION OF SOME EMBODIMENTS

Examples of a system, method, and apparatus for providing a digital collectible platform are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to "one example embodiment," "one embodiment," or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such, "one embodiment" can also be used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Figure 1:
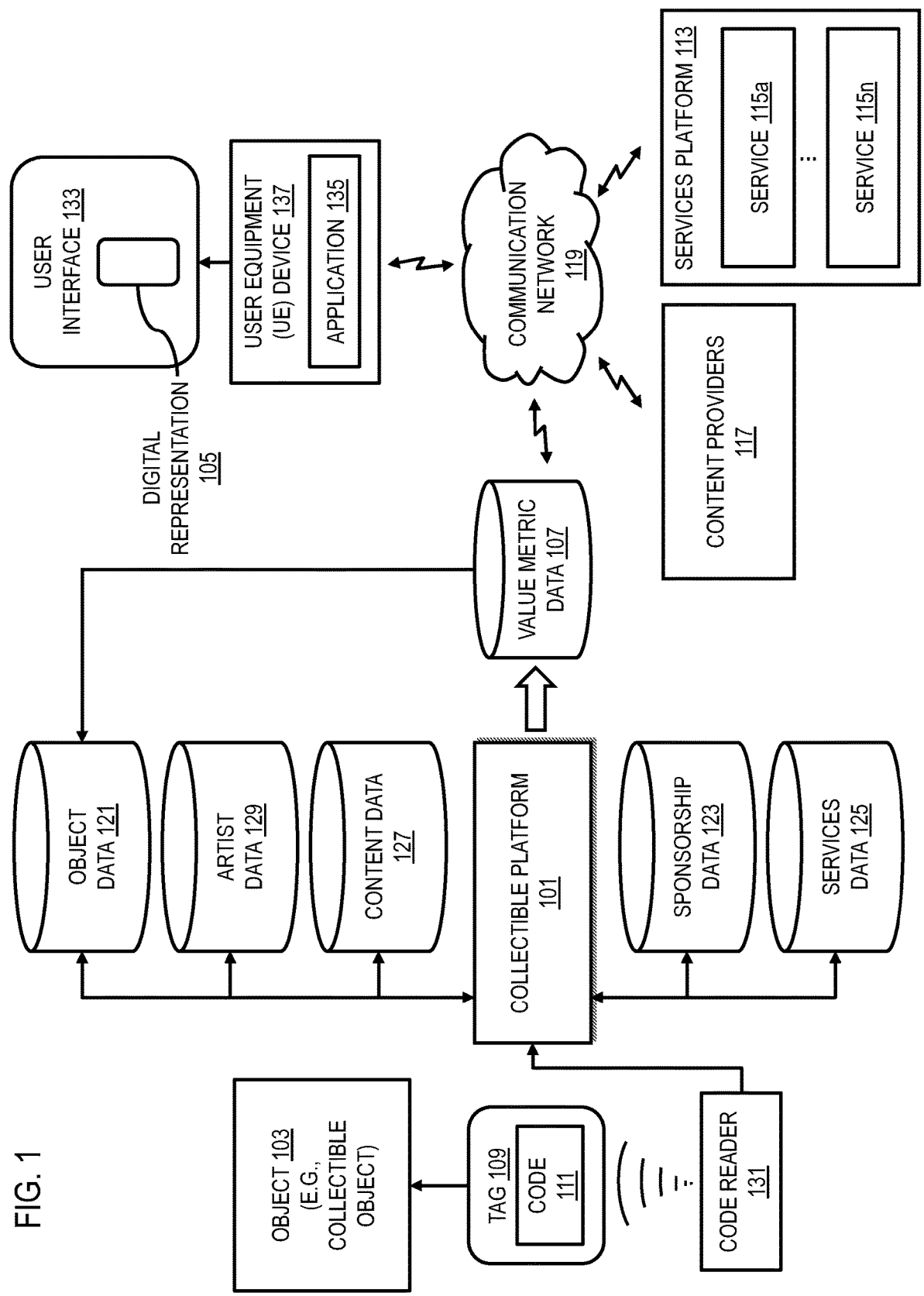
FIG. 1 is a diagram of a system capable of providing a digital collectible platform, according to one example embodiment.

FIG. 1 is a diagram of a system 100 capable of providing a digital collectible platform 101, according to one example embodiment. Collectible items are objects (e.g., object 103) that are valued and sought after by collectors due to their rarity, historical significance, aesthetic appeal, cultural importance, and/or any other purpose. These items are typically acquired and preserved by individuals with a passion for collecting, often as a hobby or investment. Collectibles can range from antiques and artwork to toys, coins, stamps, trading cards, memorabilia, cars, and more. Limited edition objects are a form of collectible or limited portrayals of public or famous figures in a tangible or intangible media of any form are considered collectibles. In addition, in one embodiment, a single object providing limited or selective access to the object is a collectible, for example, where the object is a representation of thing or person, such as a famous or public figure, and in providing access to the object, those with access are provided certain attribute data for affecting the dynamic value metric. These attribute data may include an engagement with the object, i.e., one-on-one meeting, tickets to an event, object limited edition merchandise or other special or personalized object related merchandise or even object endorsed items including merchandise. In addition in one embodiment, the number of different attribute data associated with an owner of an object provides the owner with a higher status level, i.e., a super fan, with additional access to new or additional attribute data, i.e., even more special merchandise or object access or even a form of sponsorship such as "likes" or "sharing" of a post. In a further embodiment, the owner of an object with the higher status level is granted additional attribute data which is a right to offer a secondary object related to the owner of the object (first or initial object).

Potential collectors or consumers who want to buy, sell, and/or trade these objects 103 may find it difficult to determine or estimate their respective values (e.g., monetary values), particularly as the variety and number of collectible objects expands. Traditionally, consumers would have to look to the marketplace to see how much comparable objects have previously sold or traded for. But this traditional process is fraught with uncertainty.

In addition, many collectors face the dilemma of wanting to engage with their collectible objects 103 without risking damage or depreciation in value. This fear often stems from the intrinsic nature of collectibles as delicate or rare items, where even minor handling could potentially diminish their worth. Consequently, collectors may find themselves hesitant to physically interact with their objects 103, opting instead to keep them stored away or displayed behind protective barriers. However, this cautious approach often leads to a desire for a more interactive and immersive experience beyond merely owning the objects 103. Collectors may want to explore the intricate details, historical significance, and personal connections associated with their collections, seeking avenues to engage with them on a deeper level. Consequently, there is a growing demand for innovative solutions that allow collectors to interact with their items in meaningful ways while preserving their integrity and value. This could entail new experiences based on technologies such as but not limited to digital replicas (e.g., a digital representation 105), virtual reality simulations, augmented reality experiences, or interactive experiences that offer meaning interaction without compromising their physical condition or investment value of objects 103. These technological experiences can add further value to objects, making the computation and presentation of the values (e.g., dynamic value metric data 107) of these objects 103 a significant technical challenge particularly as the suite of experiences associated with the objects 103 and/or their digital representations 105 change or evolve over time.

To complexity of such value computation can be illustrated in the domain of trading cards as examples of collectible objects 103 where both general and domain-specific factors can affect the complexity of computing their dynamic value metric data 107. It is noted that trading cards are discussed herein by way of illustration and not as limitations, the various embodiments described herein are equally applicable to any other type of object 103 (e.g., especially any object such as for example antiques, artwork, toys, coins, stamps, memorabilia, cars, clothing, shoes, etc. capable of being in a tangible or intangible form). In this example scenario, trading cards have been produced for different subjects including but not limited to inanimate or animate subjects, things, places, people, vehicles, animals, paintings, etc. Historically trading cards have been produced mainly for high profile subjects or athletes. This is because one of the primary drivers of value of a trading card is for example the athlete's career and popularity—i.e., the better or more popular the athlete or player, the better the value of the athlete's trading card or separately associated merchandising or sponsorship deals for the athlete. However, recent changes in policy and laws with respect to college athletes' being able to benefit from their name, image, and likeness (NIL) opens up the opportunity for many more in particular athletes to explore trading card and/or related sponsorship deals.

Thus, with this change in NIL policy many more athletes (e.g., athletes) are eligible to benefit from NIL likeness opportunities including trading card deals and/or related sponsorships. However, because these athletes are now eligible for NIL deals does not mean the opportunities are also easier to get. For example, lesser known athletes may still find it difficult to discover available NIL sponsorships and how to obtain them. Conversely, potential sponsors (e.g., corporations) may find it difficult to discover what athletes are available for them to sponsor. In either case, keeping track of the NIL deals and sponsorship for reporting requirements as well as for computing the dynamic value metric data 107 for can also be complex and difficult.

Accordingly, a service provider who seeks to provide technical solutions to making trading card values, related sponsorships, or NIL opportunities more easily accessible to athletes, consumers, and/or other stakeholders face significant technical challenges. There are also technical challenges with the scenario of making athletes or other subjects more easily accessible to potential sponsors. By way of example, these technical challenges include but are not limited to providing a unique user experience and interactive platform that comprehensively addresses the problems and issues described above. These challenges then extend to other types of collectibles and interactive technologies associated with them.

In one embodiment, to address these technical challenges, the system 100 of FIG. 1 introduces a digital collectible platform 101 with the capability to use a physical tag 109 that includes or is otherwise configured with a machine readable code 111 that links objects 103 to their respective value metric data 107 and provides a digital gateway between the objects 103 and respective interactive services (e.g., provided by a services platform 113, one or more services 115a-115n—also collectively referred to as services 115—of the services platform 113, and/or one or more content providers 117 over a communication network 119). In one embodiment, the services platform 113, services 115, and/or content providers 117 can provide for unique interactive experiences that add to the dynamic values (e.g., dynamic value metric data 107) such as but not limited to collaborative links between content creators associated with the objects 103, completion on tasks (e.g., interactive tasks) that generate value to for the cards, access rights to social media content (e.g., special or restricted feeds/communities dedicated to the objects 103), etc. In one embodiment, the digital collectible platform 101 has access to attribute data (e.g., object data 121, sponsorship data 123, services data 125, content data 127, and/or any other type of data) of the objects 103 that can affect their dynamic value metrics and/or can be used for computing their dynamic value metrics 107. In one embodiment, attribute data include any other type of data in addition or as an alternate to the specific example types of data listed above or discussed herein. In another embodiment, the digital collectible platform 101 can be used to enable object owners or other stakeholders/consumers to be matched with one or more artists (e.g., represented in a database of artist data 129) to create one or more digital representations 105 of the objects 103 which serve as unique user interfaces 133 to related digital interactions with the digital representations 105 or otherwise related to the objects 103.

It is noted that as used herein, the term object 103 refers to any object, item, or thing that can be associated with a physical tag 109 and registered with the digital collectible platform 101. Accordingly, although the various embodiments described herein may refer to specific examples of an object 103 (e.g., a car, trading card, etc.), it is contemplated wherever the description refers to a specific object example, the description can also apply to any object 103 in general. For example, as previously noted, examples of an object 103 include but are not limited to trading cards, cards, antiques, artworks, coins, stamps, memorabilia, toys, jewelry, books, posters, articles of clothing, etc. The attributes associated with an object 103 (e.g., used to compute the dynamic value metric data 107 for the object 103) can also vary with the type of object 103. For example, cars can include performance statistics and/or rarity, while animals may have attributes indicating breed, age, agility, etc.

In one embodiment, a physical tag 109 is created with an object identifier corresponding to a particular object 103 that is encoded as a machine readable code 111 (e.g., bar code, quick response (QR) code, near field communication (NFC), Bluetooth beacon, etc.). As used herein, a machine-readable code 111 is a graphical representation of data that can be interpreted and processed by a machine or electronic device. These codes 111 are designed to be easily scanned or read using specialized hardware or software (e.g., a code reader 131), such as barcode scanners, QR code readers, or optical character recognition (OCR) systems. Machine-readable codes 111 encode information in a format that can be quickly and accurately extracted, enabling automated data capture and processing. In another embodiment, the machine readable code 111 can be any unique identifier (e.g., serial number, object identifier, etc.) that need not be scanned but can be input via any other means (e.g., manual entry) into a machine or electronic device to activate the functions of the system 100. For example, a serial number of an object 103 can be input via a web link or other user interface to provide the machine readable code 111 to the digital collectible platform 101 for linking to a corresponding digital representation 105. In this scenario, the serial number is considered to be a "machine readable code 111" because it is read as input through entry in the user interface of the machine or device.

In one embodiment, to associate a physical tag 109 with an object 103, various methods can be employed depending on the object 103's characteristics and intended application. As used herein, a physical tag 109 refers to a tangible tag. For example, adhesive labels or stickers can be used for objects 103 with smooth surfaces, allowing for direct attachment while accommodating machine-readable codes like barcodes or QR codes. For objects 103 requiring a more durable or permanent solution, options such as printing, engraving, or etching the code directly onto a surface of the object 103 can ensure long-term association without compromising the object 103's integrity. In one embodiment, the permanent solution is secured in some manner, i.e., holographic, special thread, nanoparticles, inks, or coatings, etc. For example, holographic stickers or labels use holographic technology to create visually striking and tamper-evident tags that can be affixed directly onto objects 103. These stickers not only enhance the aesthetic appeal but also offer a high level of durability, resisting wear and tear over time. Special threads, often made of durable materials such as nylon or polyester, can be embedded within fabrics or materials during manufacturing, allowing for the integration of machine-readable codes 111 directly into the object 103 itself. Nanoparticles, invisible to the naked eye, can be dispersed within materials of the objects 103, enabling the encoding of information at a microscopic level. This approach provides a covert and tamper-resistant method of attaching codes 111 while preserving the object 103's appearance. Additionally, specialized inks or coatings can be applied to objects 103 to create durable and wear-resistant markings that incorporate machine-readable codes 111. These coatings offer protection against environmental factors such as moisture, UV radiation, or abrasion, ensuring the longevity of the attached codes 111.

As another example, hang tags or tied tags can allow the physical tag 109 to be affixed to objects 103 that cannot accommodate direct adhesive application, such as clothing or irregularly shaped items. Embedded tags, integrated within the object 103 during manufacturing, offer a discreet and tamper-resistant solution, commonly used for product authentication or tracking purposes. Additionally, for some objects 103, plaques or plates may be employed, affixed using screws or adhesive, to provide detailed information about the object's history or significance alongside a machine-readable code. Ultimately, the method of affixing a physical tag 109 with a machine-readable code is carefully selected to ensure seamless integration with the object while facilitating efficient data capture and retrieval for authentication, tracking, or informational purposes.

In one embodiment, using the object 103 itself as a physical tag 109 presents another alternative approach to linking the object 103 to the interactive and value metric functions of the digital collectible platform 101. For example, objects 103 endowed with unique features, such as engraved serial numbers or embossed logos, inherently serve as identifiers, similar to the physical tags 109 discussed in the various embodiments above. Additionally, modern technologies facilitate the embedding of microchips or sensors directly into objects 103 during production, enabling them to store pertinent information about their identity or provenance. Natural objects 103, such as gemstones or unique wood grains, possess inherent characteristics that serve as natural "tags" for identification or service linking, while objects 103 with textured surfaces can have information encoded onto them through methods like embossing, engraving, or printing. Chemical markers applied during production provide another avenue for identification and linking, leveraging invisible markers detectable through specialized equipment. By leveraging the object 103's inherent characteristics or integrating identification features directly into it, this approach offers advantages including seamless integration, durability, and resistance to tampering or removal, making it suitable for various embodiments of identification and linking applications described herein.

In one embodiment, the term "machine-readable code 111" extends to identifiers manually input into a machine, such as a computer or device with a code input user interface for manual entry by a user, the approach broadens to encompass a wider array of identification methods. In this scenario, machine-readable codes not only include traditional barcode or QR code formats scanned by machines but also encompass alphanumeric strings or other manually entered codes. Users manually input these identifiers (e.g., object identifiers or other identifiers from which corresponding object identifiers can be derived or otherwise determined) directly into the machine via a designated interface. This approach provides flexibility for scenarios where physical tags 109 or printed codes are not feasible or available, enabling users to access information or perform actions of the system 100 by manually entering relevant codes into the machine. Whether scanned or manually entered, the machine-readable code 111 facilitates interaction between users and the corresponding objects 103 as discussed with respect to the various embodiments described herein.

The digital collectible platform 101 then uses the object identifier (e.g., as read or otherwise derived from the machine readable code 111) to associate an object 103 with its corresponding digital representation 105 (e.g., stored in a database of object data 121). The digital representation 105 is displayable in a user interface 133 generated by an application 135 (e.g., a client application to the digital collectible platform 101) executing on a user equipment (UE) device 137 (e.g., smartphone, tablet, computer, wearable device, etc.).

In one embodiment, the digital collectible platform 101 also uses the object identifier determined from an object 103 to query for one or more parameters or attributes (e.g., promotional items provide free or at a discount with the object 103, attributes of the object 103, attributes of an artist that created the artwork for the digital representation 105 of the object 103) that can be used to compute the dynamic value metric data 107 for the object 103. A dynamic value metric for an object 103 refers to a method of quantifying the worth of the object in a manner that adjusts automatically as attributes affecting its value change. This metric is dynamic in nature, meaning that it is not fixed but rather adapts in real-time based on fluctuations in the object 103's attribute data or external factors influencing its value. The dynamic value metric data 107, for instance, represents a computed dynamic value of the object 103 and can be expressed using any metric such as but not limited to a monetary value, value ranges (e.g., low, medium, high, etc.), and/or any other equivalent scale or metric. In one embodiment, the dynamic value metric can be based on any attribute queried from any of the data sources available to the digital collectible platform 101 including but not limited to the object data 121 (e.g., storing one or more attributes of the object 103—such as performance statistics, affiliations, digital representation 105, etc.), artist data 129 (e.g., storing one or more attributes of the artist that created the digital representation 105 for the object 103), sponsorship data 123 (e.g., storing data records of sponsorships associated with the object 103), services data 125 (e.g., storing data indicated services included with or otherwise provided by the object 103), content data 127 (e.g., storing data associated content for or otherwise included with the digital representation 105 of the object 103), etc. The data records in the various embodiments of the data sources of the system 100 are collectively referred to herein as attribute data records or attribute data.

For example, the digital collectible platform 101 can query sponsorship data 123 for any sponsorship data records that indicate the availability of redeemable items or services associated with the object 103. For example, one or more sponsors may have agreed to provide promotional items that are free or provided at a discount to the owner of or any other consumer/stakeholder associated with the object 103. The value of these promotional items can be at least one parameter in computing the dynamic value metric of the corresponding object 103.

Similarly, in one embodiment, the object 103 may include one or more services (e.g., a call, text, social media post, video, meet and greet, autograph, etc. with the subject of the object 103) that are to be provided to the owner of the object 103. The data records indicating these services can be queried from the services data 125 using the object identifier. In one embodiment, the dynamic value metric data 107 of the object 103 can be further computed based on the availability of the services. By way of example, the services can be performed or verified to have been performed over communication network 119 via a services platform 113 comprising one or more services 115 such as social media services, shopping services, and/or the like. For example, if a service involves tasks such as but not limited to the owner/stakeholder posting a social media message, verification of the posting of the message on a social media service (e.g., service 115) can be used to confirm that the service or task associated with the object 103 has been performed.

In one embodiment, the object 103 may include access to content (e.g., social media content, video content, audio content, etc.). One example of the content includes promotional videos of the subject. Other examples include access to restructured social media feeds, restricted social media communities, etc. As used herein, restricted social media feeds or restricted social media communities refer to specific areas within social networking platforms (e.g., services 115) where access is limited to a select group of users (e.g., owners of certain objects 103 or designated collections of those objects 103 registered with the digital collectible platform 101). Unlike public feeds or communities that are accessible to anyone, restricted feeds or communities impose restrictions on who can view, interact with, or contribute content to them. These restrictions are typically set by the creator or administrator of the feed or community and may require users to meet certain criteria or receive invitations to gain access (e.g., ownership or registration of certain objects 103 or collection of objects 103). Restricted social media feeds may include updates, discussions, photos, videos, or other content that are related to corresponding objects 103 or collection of objects 103 limited to stakeholders associated with the objects 103. Restricted social media communities function similarly to restricted feeds but are typically organized around specific topics, interests, or affiliations associated with the corresponding objects 103 or collection of objects 103. Users within these communities share common interests or goals and may use the platform to exchange ideas, collaborate on projects, or engage in discussions relevant to the themes related to the corresponding object 103. Access to these communities may be restricted to ensure that members share a common bond or interest and to foster a sense of exclusivity or privacy within the group. In one embodiment, the dynamic value metric data 107 associated with the object 103 can be computed further based on access rights to the restricted social media feeds and/or restricted social media content.

Other examples of content include programming content, broadcasting content, streaming content, etc. provided by one or more content providers 117 (e.g., over communication network 119). The content provided by the one or more content providers 117 can include paid content, subscriptions, content restricted to owners of the object 103, pay-per-view content, etc. that are provided free or at a discounted rate. In this case, the object identifier or any other authentication mechanism can be used to determine access rights to the content. In one embodiment, the content can be streamed and displayed in the user interface 133 as part of the digital representation 105 of the object 103. For example, the content can be rendered in UI element within the rendered digital representation 105. In one embodiment, the dynamic value metric data 107 associated with the object 103 can be computed further based on the availability of the content from the content providers 117.

In one embodiment, a value metric data 107 of an object 103 can also be based on attributes of the object and/or the artist associated with the digital representation 105 of object 103. For example, the digital collectible platform 101 can query for object data 121 indicating one or more attributes of the object (e.g., popularity, characteristics, overall sales/revenue associated with the object or merchandise related to the object, etc.). In one embodiment, the overall sales or revenue generated by an object 103 and/or related merchandise (e.g., apparel, replicas, art, etc.) can serve as an attribute used to determine the dynamic value metric of the object 103. The sales data, for instance, can be queried from the services platform 113 (e.g., sales platform), services 115, and/or content providers 117. As used herein, sales refers broadly the exchange of goods or services associated with the object 103 and/or related merchandise for compensation (e.g., monetary or otherwise), and includes but is not limited to merchandise sales, product sales, offer sales, ticket sales, etc. By integrating sales data into the valuation process, the dynamic value metric can effectively capture the commercial success and market performance of the object 103 and its associated products. High sales figures and revenue (e.g., above a threshold value) indicate strong demand and consumer interest, reflecting positively on the object 103's perceived value which can be quantified by the system 100 in the dynamic value metric data 107. Conversely, lower sales or revenue may suggest weaker demand or market saturation, potentially leading to a decrease in value which also can be quantified by the system 100 in the dynamic value metric data 107. Additionally, analyzing sales trends over time allows for a dynamic assessment of the object 103's dynamic value metric, considering fluctuations in market demand and consumer behavior. By incorporating overall sales and revenue data alongside other relevant attributes such as user engagement, feedback, and market trends, the dynamic value metric provides a comprehensive and data-driven evaluation of the object 103's value within its commercial context. This holistic approach ensures that the value metric remains responsive to real-world dynamics, offering users valuable insights for decision-making and investment strategies.

It is noted that the various embodiments in which sales are one factor in computing the dynamic value metric as discussed above are provided by way of illustration and not as a limitation. It is contemplated that any other attribute that can affect the dynamic value metric can be used in addition or as an alternate to sales in any combination. The specific attribute(s) or combination of attributes can depend on the domain or type of object 103.

In uses cases where the object 103 is an athlete, celebrity, musician, etc. or is otherwise associated with an athlete, celebrity, musician, etc. attributes that can be computed to potentially increase the dynamic value metric include but are not limited to: Division 1; Division 2; Division 3; If They Start/Do Not Start for Their Team; Stadium Attendance; How Many Articles on Player; How Many Followers on Social; Stats; Score; Awards; Sponsor Social Shares; Sponsor Social Likes; Social Media Likes; Social Media Views; Social Media Followers; How Fast They Sell; How Many Purchases; Win or Loss; Full Set Purchased; Legacy; How Many Sponsors They Have; Walk On; 1 Star; 2 Star; 3 Star; 4 Star; 5 Star; Card Posts; Card Likes; Services Engaged; Services Revenue; Followers on All-Stars; Artists Value; Fan Rating; University Popularity; Purchased Revenue Within Card; How Many Memorabilia Inside Card; Artists Cards Sales; Artists Engagement; Views; TV Interviews; Podcasts; Social Media Interviews; Paid; Click Through On Sponsors; Long Term Potential; Reserve To Purchase; Athlete Purchases; Speaking Engagements; Bowl Games; Draft 1st Round; Draft 2nd Round; Draft 3rd Round; Draft 4th Round; Draft 5th Round; Draft 6th Round; Draft 7th Round; Undrafted; and Minor League.

In contrast, attributes that can be computed to potentially decrease the dynamic value metric include but are not limited to: Inactivity; Lack of Sales; Bad Articles; Kick Off Team; Lack of Artists Engagement; Lack of Memorabilia Inside Card; Unfollowing; Fan Rating; Industry Rating; Game Loss; Decrease in Average Sales; Artists Engagement; Injury; Lack of Views. Again, these attributes are provided by way of illustration and not as limitations.

In use cases where the object 103 is a car, the object data 121 can include but is not limited to make, model, year, features, condition, provenance, etc. In addition, sales of related merchandise (e.g., replica toy cars, t-shirts, posters, digital downloads, etc.) can be quantified and considered when computing its dynamic value metric. Similarly, the digital collectible platform 101 can query for artist data 129 indicating one or more attributes of the artist responsible for the artwork or visual design of the digital representation 105 of the object 103. Example of artist attributes include but is not limited to popularity, experience, artistic portfolio, style, previously sold artwork, etc. The digital collectible platform 101 can then compute the dynamic value metric data 107 for the object 103 further based on the attributes of the associated object and/or artist.

In yet another embodiment, the dynamic value metric data 107 can also be based on ownership of a suite or combination (e.g., collection) of objects 103. For example, collecting a designated set of objects 103 (e.g., objects 103 from all items in a designated collection) as a single collection can create a bonus value over the individual value metrics of each object 103 in the collection. It is contemplated that an individual object 103 can be designated as a part of one or any number of suites or collections. The collection of objects 103, for instance, can be designated and stored in the content data 127.

Figure 2B:
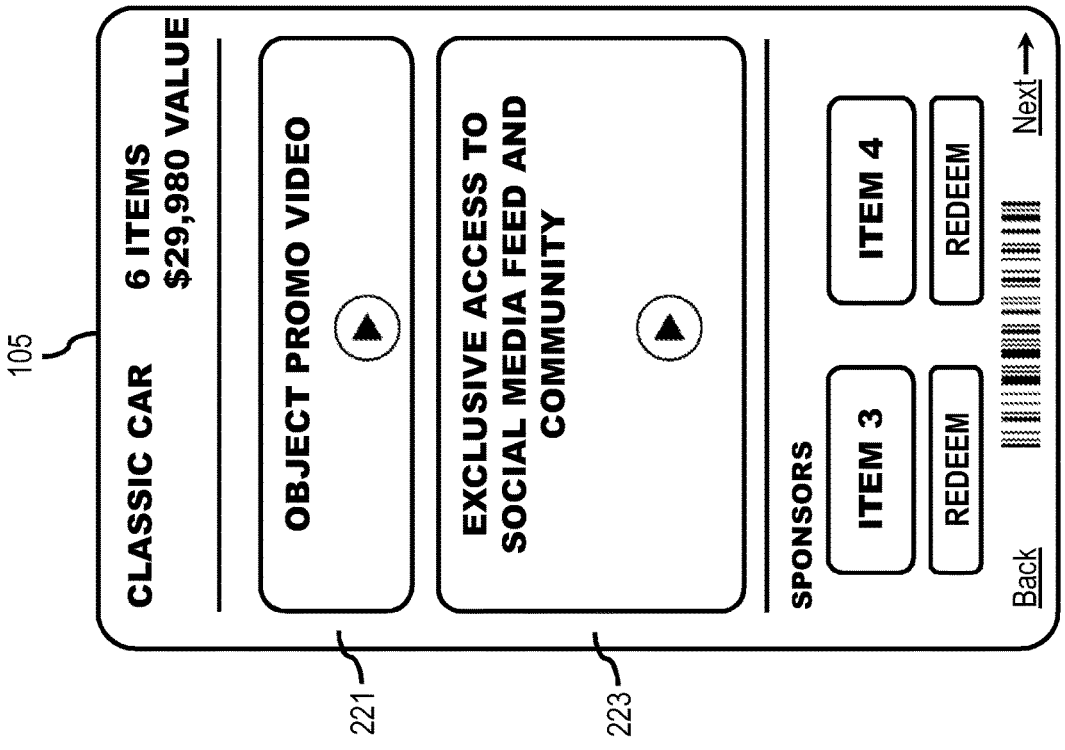
FIGS. 2A-2C are diagrams illustrating examples of a digital representation of an object, according to one example embodiment.
Figure 2A:
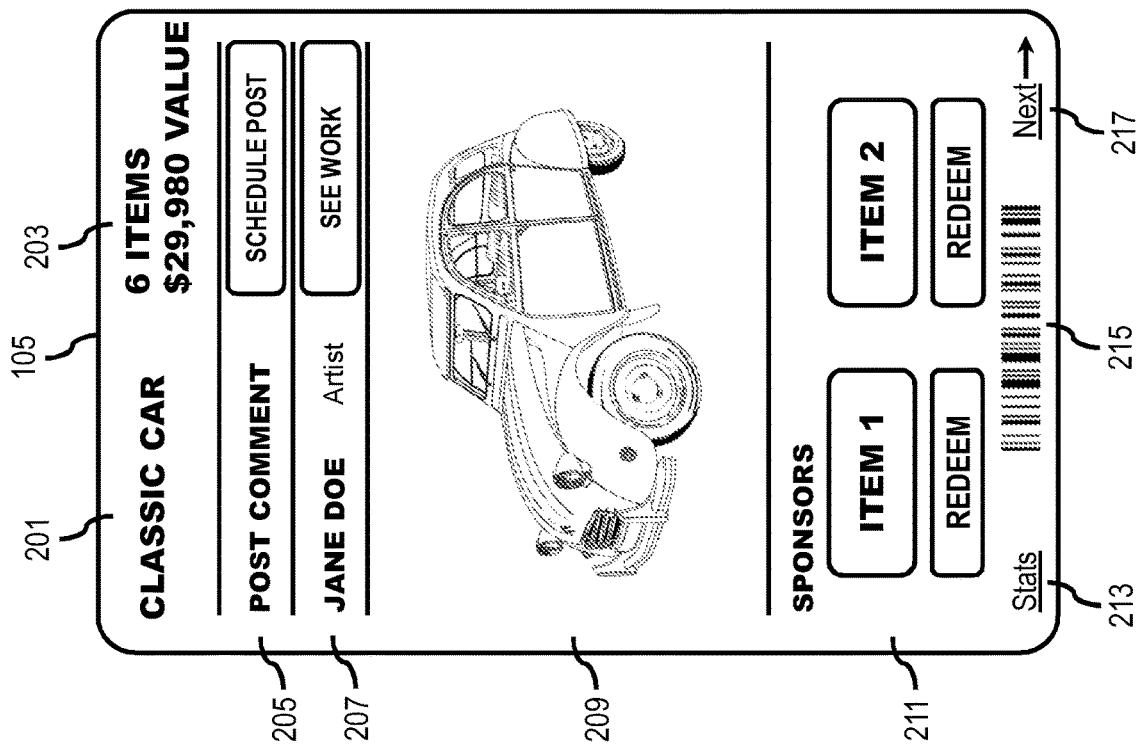
Figure 2C:
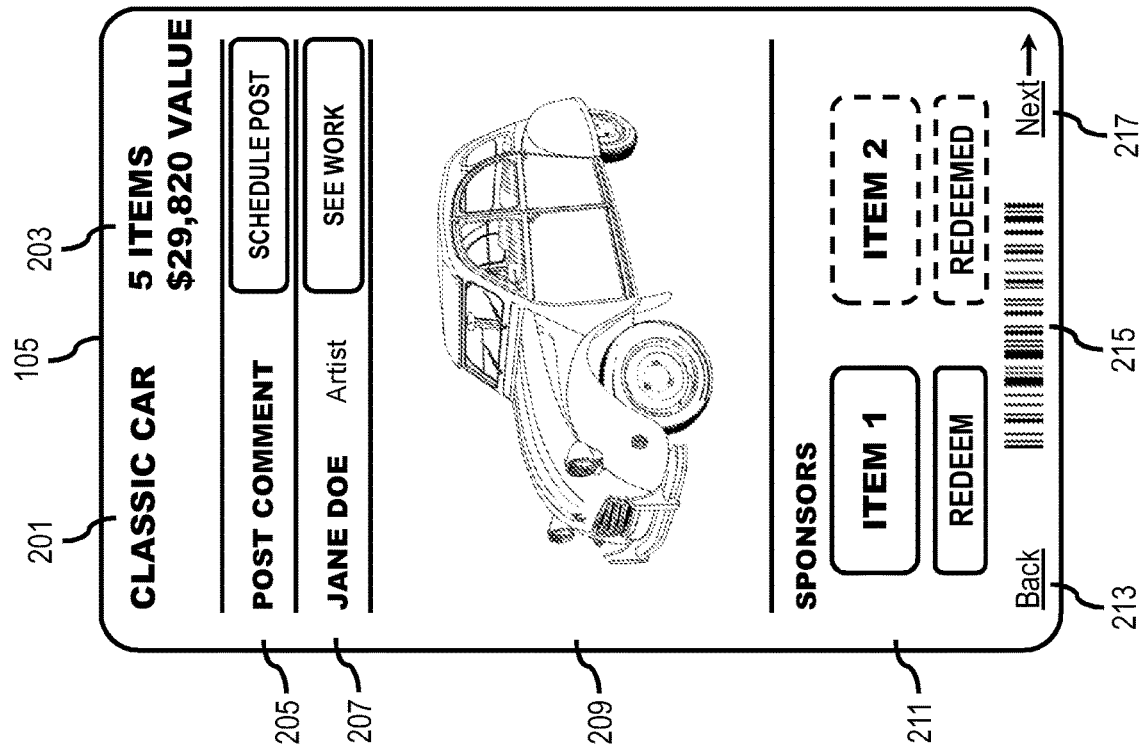

In one embodiment, the dynamic value metric data 107, object data 121, artist data 129, content data 127, sponsorship data 123, services data 125, and/or content from content providers 117 associated with the object 103 can be aggregated and presented in the digital representation 105 of the object 103 as shown in the examples of FIGS. 2A-2C. While FIGS. 2A-2C depict one example of a digital representation 105 of an object 103 presented in a two-dimensional user interface, it is contemplated that the digital representation 105 can take various forms, including but not limited to three-dimensional representations. These three-dimensional representations can encompass a range of digital replicas, such as 3D models, virtual/augmented reality (VR/AR) objects presented in AR/VR headsets, holograms, and more. By expanding beyond traditional two-dimensional interfaces, users can experience a more immersive and interactive digital representation 105 of the object 103, allowing for enhanced engagement and exploration. Whether through 3D models that offer a realistic portrayal, VR/AR experiences that provide simulated interactions, or holographic displays that offer a futuristic viewing experience, the versatility of the various embodiment of the digital representation 105 ensures that users can engage with objects 103 in a manner that best suits their preferences and technological capabilities.

FIGS. 2A-2C are diagrams illustrating examples of a digital representation 105 of an object 103, according to one example embodiment. In the example of FIG. 2A, a first page of the digital representation 105 is illustrated. The digital representation 105 can be rendered in a user interface (UI) 133 of a user equipment (UE) device 137 via an application 135. The digital representation 105 includes, for instance:

a UI element 201 displaying information on the object such the object's name or type (e.g., "Classic Car") (e.g., queried from object data 121);

a UI element 203 displaying the number of associated promotional items (e.g., queried from the sponsorship data 123) and the dynamic value metric data 107 (e.g., computed for the object 103 according to the various embodiments described herein);

a UI element 205 displaying a service or task (e.g., post a comment about the object 103 or a social media site) that is included with the object 103 (e.g., queried from the services data 125) where completion of the task can result in an increase of the dynamic value metric 107, granting of a new promotional item, etc.;

a UI element 207 displaying information on the artist responsible for the artwork or visual design of the digital representation 105 of object 103 (e.g., queried from the artist data 129);

a UI element 209 displaying the artwork or visual design of the digital representation 105 of the object 103 created by the artist specified in UI element 207 (e.g., queried from the object data 121 and/or artist data 129);

a UI element 211 displaying the promotional items (e.g., provided by one or more sponsors) that are included with the object 103 and controls for redeeming the items (e.g., queried from the sponsorship data 123);

a UI element 213 linking to the characteristics, attribute, descriptive statistics, etc. of the object 103 (e.g., queried from the object data 121 and/or one or more third party statistics providers such as a service 115 of the services platform 113);

a UI element 215 displaying a barcode (or equivalent machine readable code) that encodes an object identifier to link the digital representation 105 to the physical object 103 via its physical tag 109 (e.g., queried from the content data 127); and a UI element 217 displaying a navigation control element to display a subsequent view of the digital representation 105 of the object 103, thereby enabling the digital representation 105 to comprise multiple pages within a single digital representation 105 depending on the user interface design or available object data (e.g., queried from the object data 121).

FIG. 2B illustrates an example second page of the digital representation 105 of FIG. 2A. In this example, in addition to common UI elements shared with the first page of the digital representation 105 shown in FIG. 2A, the second page of the digital representation 105 includes, for instance:

a UI element 221 for displaying a promotional video (or other media) related to the object 103 and providing media controls for controlling playback of the content from the UI element 221 itself (e.g., queried from the object data 121 and/or content providers 117); and a UI element 223 for displaying content available from one or more content providers 117 (e.g., including but not limited to restricted social media feeds and/or social media communities) and providing media controls for controlling playback of the content from the UI element 223 itself (e.g., as a sponsored placement of the content in the digital representation 105 of the object 103 with other examples including but not limited to broadcast programming, streaming services, video on demand services, pay-per-view services, and/or the like) (e.g., queried from the sponsorship data 123 and/or content providers 117).

FIG. 2C illustrates an example use of an interactive element of the digital representation 105 as shown in FIG. 2A, according to one example embodiment. In this example, a consumer of the object 103 interacts with the digital representation 105 to redeem promotional item 2 listed UI element 211. The consumer, for instance, clicks on the redeem option depicted under the representation of promotion item 2 to initiate the redemption. One example embodiment of the redemption process is described in further detail with respect to FIG. 5 below. On confirmation of the redemption of the requested item (e.g., promotional item 2), UI element 211 of the digital representation 105 can be updated to visually indicate that the listed item 2 has been redeemed. In one embodiment, the visual indication can include but is not limited to the changing the rendered appearance of the item 2 (e.g., by rendering item 2 with a dashed line versus a solid line as shown). In addition, the digital collectible platform 101 can update the corresponding value metric 107 and sponsorship data 123 to indicate the redemption and render the updated information in UI element 203. For example, as shown, UI element 203 has been updated to indicate a "5 Items" versus the original "6 Items" remaining, and a new value metric from of "$29,820" versus the original "$29,980."

It is noted that the examples of a digital representation 105 of an object 103 described with respect to the FIGS. 2A-2C are provided by way of illustration and not as limitations. It is contemplated that any one or more of the illustrated UI elements may combined, eliminated, or rendered in any arrangement or configuration.

In one embodiment, one or more of the components of the system 100 may be implemented as a cloud-based service, local service, native application, or combination thereof. The functions of the system 100 and its components are discussed with respect to figures below.

Figure 3:
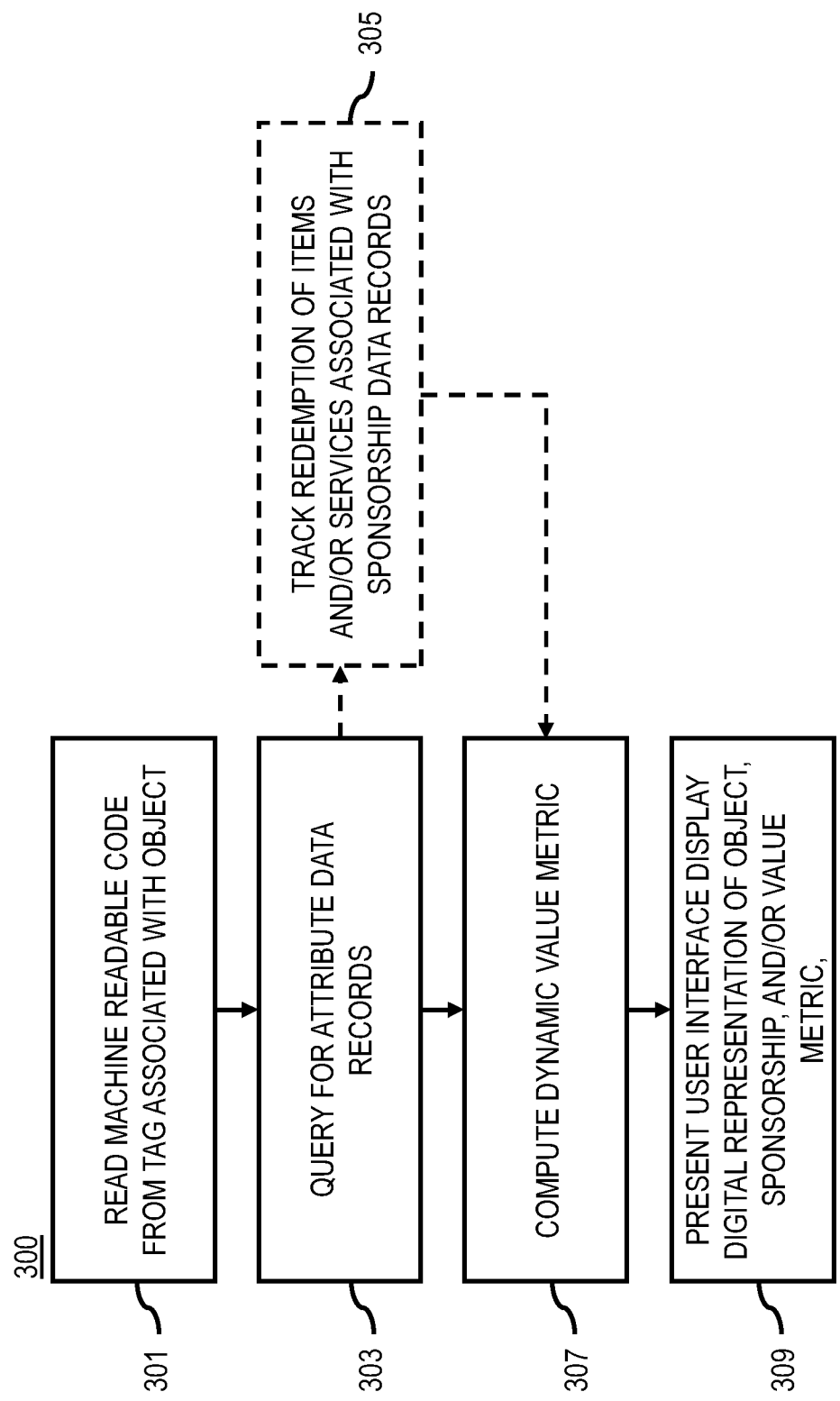
FIG. 3 is a flowchart of a process for presenting a digital representation of an object, according to one example embodiment.
Figure 18:
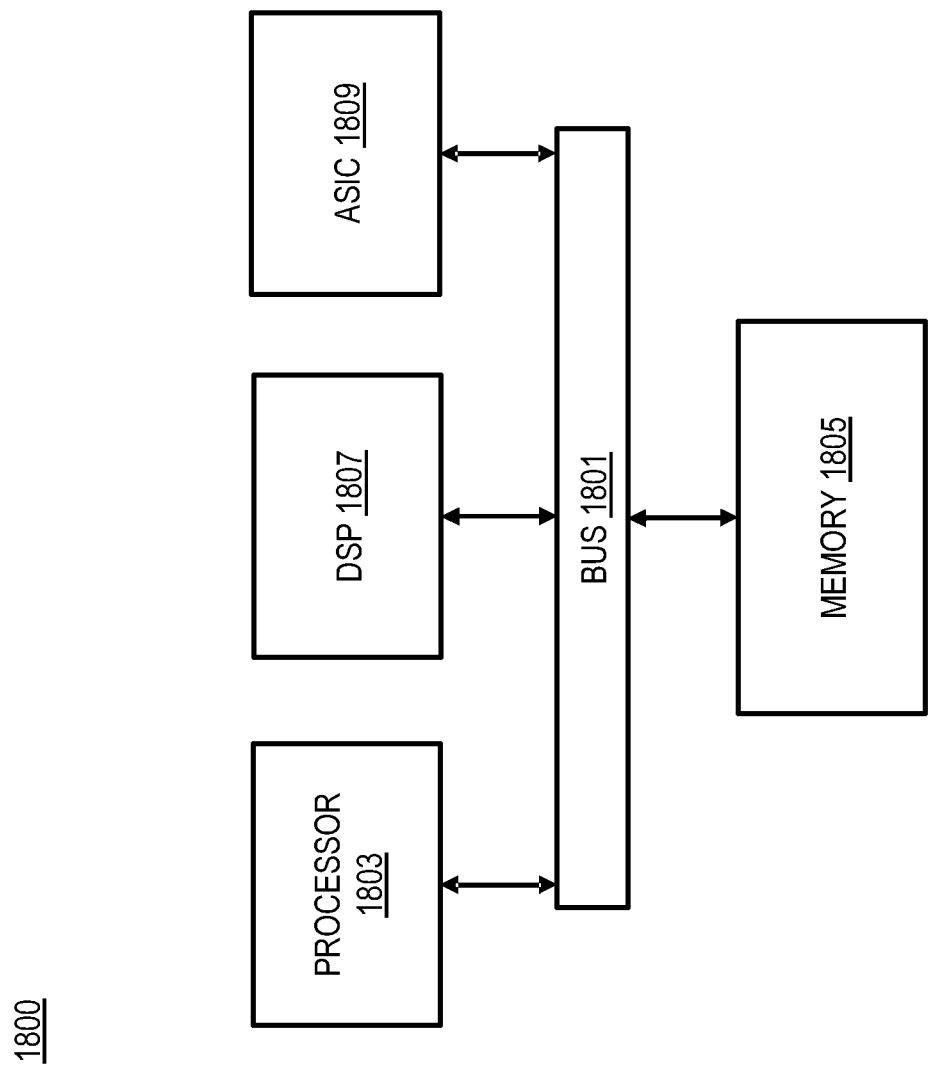
FIG. 18 is a diagram of a chip set that can be used to implement an example embodiment of the processes described herein.

FIG. 3 is a flowchart of a process 300 for presenting a digital representation 105 of an object 103, according to one example embodiment. In various example embodiments, the digital collectible platform 101 alone or in combination with the application 135 may perform one or more portions of a process 300 and may be implemented in/by various means, for instance, a chip set including a processor and a memory as shown in FIG. 18 or in a circuitry, hardware, firmware, software, or in any combination thereof. In one example embodiment, the circuitry includes but is not limited to processing circuitry, code reading circuitry, and output circuitry. As such, the system 100, digital collectible platform 101, application 135, and/or any associated apparatus, device, circuitry, system, computer program product, and/or non-transitory computer readable medium can provide means for accomplishing various parts of the process 300, as well as means for accomplishing embodiments of other processes described herein. Although the process 300 is illustrated and described as a sequence of steps, it is contemplated that various embodiments of the process 300 may be performed in any order or combination and need not include all of the illustrated steps.

In one embodiment, the process 300 assumes that a physical tag 109 configured with a machine readable code 111 has been created to affix to an object 103 and to register the object 103 with the digital collectible platform 101. By way of example, to register the object 103 with the digital collectible platform 101 using the physical tag 109 configured with a machine-readable code 111, the tag is scanned using a compatible device equipped with scanning software. The machine-readable code 111 contains or otherwise links to unique information about the object 103, such as its identity, provenance, or ownership details, which is then uploaded to the digital collectible platform 101's database (e.g., object data 121). This process allows the object 103 to be securely registered and authenticated within the digital collectible platform 101's ecosystem, facilitating access to the functions of various embodiments described herein. The physical tag 109, for instance, includes the characteristics and related data to link the tag 109 to the object 103 as discussed with respect to the various embodiments described herein. For example, the object 103 can depict or otherwise include, at a minimum, a barcode or other machine readable code 111 (e.g., QR code, NFC, RFID, etc.). The machine readable code 111, for instance, encodes an object identifier that can be processed by the digital collectible platform 101. In addition to the machine readable code 111, the object 103 can include all or a portion of the of the elements described with respect to embodiments the digital representation 105 described with respect to FIGS. 2A-2C.

In one embodiment, the object 103 can be linked or otherwise registered to a corresponding digital representation 105 of the object 103 stored by the digital collectible platform 101 (e.g., in object data 121 or equivalent database). One example of the digital representation 105 of the object 103 includes but is not limited to a non-fungible token (NFT) that tracks the ownership and any related sponsorship/promotional contracts as smart contracts on a blockchain (e.g., maintained via the Ethereum network or other equivalent blockchain or cryptocurrency network).

Then, in step 301, a code reader 131 can read or be configured to read the machine readable code 111 from the object 103 to determine an object identifier. In one embodiment, the code reader can be a standalone code reader 131 (e.g., bar code reading apparatus or equivalent) or a component of the UE 137 (e.g., a camera sensor capable of scanning, NFC module, RFID module, Bluetooth module, etc.). The object identifier can be any identifier that can be used to match the object 103 to a respective digital representation 105. In one embodiment, the object identifier can be unique to individual objects 103, a series of objects 103 (e.g., associated with a collection and/or any other category of objects), objects 103 specific to an object type, objects 103 specific to an artist, objects 103 specific to an artistic style, etc.

In step 303, an apparatus or processor (e.g., of the digital collectible platform 101, application 135, and/or any associated device, system, or platform) queries or is configured to query for one or more attribute data records (e.g., any of the object data 121, artist data 129, content data 127, sponsorship data 123, services data 125, content from content providers 117, etc.) associated with the object 103 based on the object identifier. As an example, sponsorship data 123 are data records indicating any sponsorship deals that are associated with the object 103 or the subject of the object 103 including but not limited to promotional items provided by corporations or other sponsors to an owner or bearer of the object 103. Promotional items include but are not limited to items that are provided for free or at a discount.

With respect to sponsorship data 123, in optional step 305, the one or more sponsorship data records are associated with one or more redeemable items, one or more redeemable services, or a combination thereof. In this case, the apparatus is further configured to track a redemption of the one or more redeemable items, the one or more redeemable services, or a combination thereof. Example embodiments of this tracking and redemption process is described in more detail with respect to FIG. 5 below. In one embodiment, the dynamic value metric 107 associated with object 103 can vary as the promotional items associated with the object 103 are redeemed. In other embodiments, new or equivalent promotional items can be used to replenish the object 103 as one owner redeems those items so that the same, or subsequent owners can also benefit from the same or equivalent promotional items. In this way, the dynamic value metric 107 of an object 103 can remain stable between different owners (e.g., when the object 103 is sold or traded) regardless of whether one or more associated promotional items have been redeemed.

In step 307, the apparatus is further configured to compute a value metric 107 based, at least in part, on the one or more attribute data records (e.g., sponsorship data 123 and/or any of attributes of the data sources of the system 100). In one embodiment, the dynamic value metric 107 is an indicator of or otherwise represents a value of the object 103 to an owner or bearer of the object 103 based on the attributes (e.g., sponsorships, object attributes, artist attributes, etc.) associated with the object 103 (e.g., sponsorships associated with the object 103 as well as the artist responsible for the artwork or visual design depicted in the digital representation 105 of the object 103.

As discussed above, in one embodiment, the apparatus is further configured to update the dynamic value metric 107 based on changes to the attributes (e.g., the redemption of the one or more redeemable items, the one or more redeemable services, completion of tasks (e.g., clicking on collaborative links, or a combination thereof) associated with the object 103. In one embodiment, the one or more redeemable services includes a stakeholder/owner/consumer of the object 103 performing a task (e.g., clicking on a collaborative link, performing a task on a service 115, etc.). As used herein, a collaborative link can be an Internet link (e.g., URL) that connects to content of one or more content creators, content providers 117, services 115, etc. In addition or alternatively, a collaborative link can be a digital connection established between multiple content creators, providers 117, or services 115, enabling them to collaborate and share resources, content, or functionalities seamlessly. This link facilitates interoperability and integration between different platforms or systems, allowing users to access a wider range of features or content from various sources in a unified environment. Collaborative links foster synergy among stakeholders, encouraging cooperation, innovation, and the creation of value-added experiences for users across diverse digital ecosystems that are linked by objects 103.

In cases where a service or task is to be performed via a service 115 (e.g., social media service or network) of a services platform 113 (e.g., a social post on a social media service), the apparatus is further configured to query the social media platform (e.g., services platform 113 and/or services 115) to determine a completion of the task. Then, the redemption is tracked based on the completion of the task. For example, the determining of the completion of the task comprises querying social media platform (e.g., via an application programming interface (API) or equivalent) for a social media post by the subject with the requested content (e.g., by querying and identifying key words, dates, etc. in the social media post, or performing a machine learning-based analysis of the post to determine whether the request message parameters are present).

In embodiment, the digital representation 105 of the object 103 can depict information of data about the object 103. In this case, the apparatus is further configured to query for one or more object attribute data records (e.g., object data 121) indicating one or more attributes of the object 103. The digital collectible platform 101 can then compute the dynamic value metric 107 further based on the one or more object attribute data records. In an example use case in which the object 103 is a collectible car, the one or more attributes of the car can include one or more performance statistics, one or more organization affiliations (e.g., manufacturer, racing league, etc.), or a combination thereof. The dynamic value metric 107 can then be based on the object attributes (e.g., increasing the dynamic value metric 107 based on a popularity of the car, the car's related sport, the car's performance statistics, the car's provenance, car's pole position, etc.).

In one embodiment, the object 103 is associated with an artist that creates or has created artwork or a visual design of the digital representation 105 of the object 103. In this embodiment, the apparatus is further configured to query for one or more artist attribute data records (e.g., artist data 129) indicating one or more attributes of the artist. The apparatus is then configured to compute the dynamic value metric 107 further based on the one or more artist attribute data records. For example, similar to the subject-based changes to the dynamic value metric 107, the dynamic value metric 107 can be based on the artist and the artist's associated attributes (e.g., increasing the dynamic value metric 107 based on a popularity of the artist, the artist's work, the artist's style, the artist's organizational/school affiliations, etc.).

Example processes for determining the dynamic value metric based on, for instance, the sponsorship data 123, services data 125, object data 121, artist data 129, content available from content providers 117, or a combination thereof is discussed in more detail with respect to FIG. 4 below.

In step 309, an application (e.g., application 135 alone or in combination with the digital collectible platform 101) presents or is otherwise configured to present a user interface 133 displaying, at least in part, a digital representation 105 of the object 103, the one or more sponsorship data records, the dynamic value metric 107, or a combination thereof. Examples of the digital representation 105 are discussed in the various embodiments of the FIGS. 2A-2C above. In other words, an intrinsic value of the object 103 is computed based, at least in part, on the value of the promotional or sponsorship items included with the card and then presented in the user interface 133 comprising the digital representation 105. As used herein, the term "intrinsic value" is the value of the object 103 based on the promotional items included with the object 103. In various embodiments, this intrinsic value (e.g., the dynamic value metric 107) can be further modified based on the services data 125, object data 121, artist data 129, content included with the object 103 from content providers 117, or a combination thereof.

In one embodiment, the dynamic value metric 107 is dynamic. Thus, the digital collectible platform 101 and/or application 135 can monitor for changes in any of the underlying data sources used to compute the dynamic value metric 107 (e.g., sponsorship data 123, services data 125, object data 121, artist data 129, content available from content providers 117, or a combination thereof) and updates the dynamic value metric 107 accordingly. The application is then further configured to display the updated value metric in the user interface 133 as changes in value occur. In some embodiments, alerts based on changes to the metric can be set. For example, a consumer can set an alert to indicate when the dynamic value metric 107 for a given object 103 increases or decreases by more than a threshold value, or reaches a predetermined target value, and/or the like.

Figure 4:
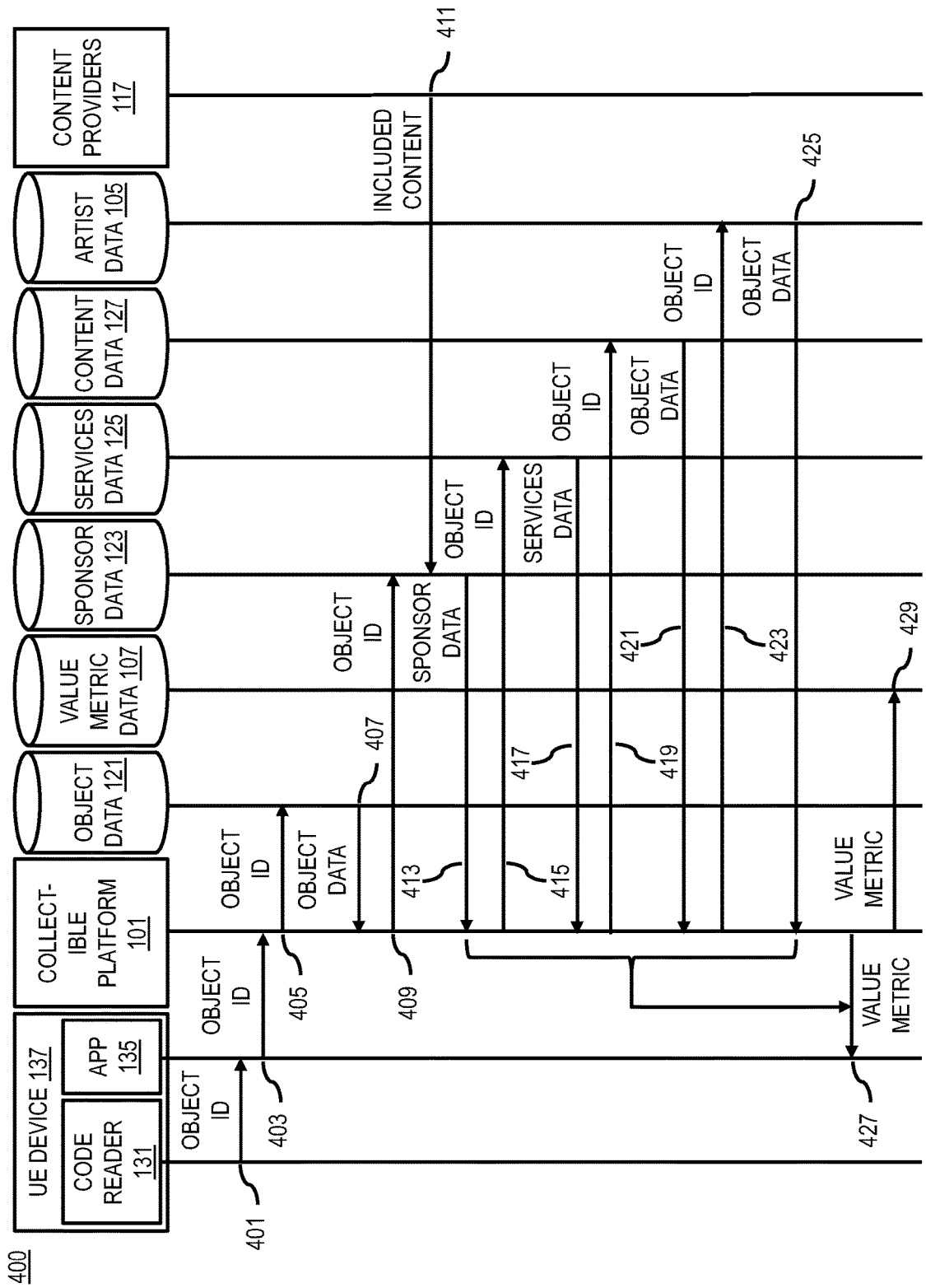
FIG. 4 is a time-sequence diagram that illustrates a sequence of messages and processes between system components for computing a value metric for an object, according to one example embodiment.

FIG. 4 is a time-sequence diagram 400 that illustrates a sequence of messages and processes between system components for computing a value metric 107 for an object 103, according to one example embodiment. A message that is passed from one process to another is represented by horizontal arrows. The processes represented in FIG. 4 are a UE 137 associated with a code reader 131 and application 135, the digital collectible platform 101, content data 127, value metric data 107, sponsorship data 123, services data 125, object data 121, artist data 129, and content providers 117.

In one embodiment, the time-sequence diagram 400 starts with the code reader 131 (e.g., associated with UE 137) determining an object identifier associated with an object 103 of interest. As described previously, the machine readable code can be associated with the object 103 in any format (e.g., barcode, QR code, NFC, etc.). In some embodiments, the object 103 need not have a machine readable code 111. Instead, the code reader 131 can use computer vision to detect visual features of the object 103 and encode the detected visual features in a feature vector. This feature vector can then represent or otherwise be used to derive the object identifier that can be processed by the digital collectible platform 101. In many cases, the feature vector will be unique to the object 103 because the object 103's visual features are also likely to be unique.

For example, the code reader 131 can capture an image of the object 103 and then use one or more machine learning means (e.g., one or more neural networks such as but not limited to a deep neural network (DNN), convolutional neural network (CNN), You Only Look Once (YOLO) network, and/or equivalent) to detect the visual features of the card. The feature vector representing the visual features can be output directly from the machine learning means or otherwise extracted from a layer of the neural network (e.g., last layer before the output layer). Regardless of whether the object identifier is read from the machine readable code or determine using machine learning means, the code reader 131 can send the object identifier to the application 135 (e.g., a digital collectible platform 101 client) executing on the UE 137 (e.g., via message 401). The application 135 then generates an object request to forward the object identifier to the digital collectible platform 101 (e.g., via message 403).

Next, the digital collectible platform 101 uses the object identifier to query the content data 127 for data on the digital representation 105 associated with the object 103 of interest (e.g., via message 405). Data on the digital representation 105 can include but are not limited to the fields to populate and render the UI elements described with respect to FIGS. 2A-2C such as the name of the object and information on its characteristics, artwork, etc. The data is then returned to the digital collectible platform 101 (e.g., via message 407).

The digital collectible platform 101 then begins using the object identifier to further query for one or more parameters that are used to determine the dynamic value metric 107 for the object 103 of interest. For example, the digital collectible platform 101 can perform any combination of one or more of the following queries:

a query for sponsorship data 123 based on the object identifier associated with the object 103 (e.g., via message 409) including a request for any content from content providers 117 that is included with the object 103 (e.g., via message 411), with query results returned to the digital collectible platform 101 (e.g., via message 413);

a query for services data 125 for any services that are included or otherwise available to be performed by the subject of the object 103 (e.g., examples of the services include but are not limited to autographs, texts, calls, voice messages, social media posts, creation of videos, live videos, pictures, meet and greets, etc.) (e.g., via message 415), with query results returned to the digital collectible platform 101 (e.g., via message 417);

a query for object data 121 for one or more attributes of the subject (e.g., via message 419), with query results returned to the digital collectible platform 101 (e.g., via message 421); and a query for artist data 129 for one or more attributes of the artist (e.g., via message 425), with query results returned to the digital collectible platform 101 (e.g., via message 421).

In one embodiment, the digital collectible platform 101 can use the query results to compute the dynamic value metric 107 for the object 103 of interest. It is contemplated that the digital collectible platform 101 can use any process or algorithm to aggregate or transform the query results to the dynamic value metric 107. One example process includes but is not limited to a heuristic approach based on one or more equations configured in the digital collectible platform 101 to perform the computation of the dynamic value metric 107. For example, the following equation is one but not exclusive example that can be used to compute the dynamic value metric 107 from sponsorship data 123:

$$V_{Card} = \sum_{i=1}^{n} V_{PI_i}$$

where $V_{Card}$ is the dynamic value metric 107 of the object 103, n is total number of promotional items (PI), and $V_{PI_i}$ is the value of each individual promotional item ($PI_i$).

In some embodiments, additional or alternative parameters or attributes (e.g., services data 125, object data 121, artist data 129, content from content providers 117) beyond or instead of sponsorship data 123 (e.g., promotional items) are considered to compute the dynamic value metric 107. Accordingly, the following is another but not exclusive example equation that can be used to compute the dynamic value metric 107:

$$V_{Card} = \sum_{i=1}^{n} V_{PI_i} + \sum_{i=1}^{m} V_{S_i} + \sum_{i=1}^{j} V_{C_i} + \sum_{i=1}^{k} V_{SA_i} + \sum_{i=1}^{l} V_{AA_i}$$

where $V_{Card}$ is the dynamic value metric 107 of the object 103, n is total number of promotional items (PI), $V_{PI_i}$ is the value of each individual promotional item ($PI_i$), m is total number of services (S) or tasks included or otherwise available from the subject, $V_{S_i}$ is the value of each individual service ($S_i$), j (e.g., including the value of access to restricted social media feeds and/or communities) is total number of included content items (C), $V_{C_i}$ is the value of each individual content item ($C_i$), k is total number of subject attributes (SA), $V_{SA_i}$ is the value of each individual subject attribute ($SA_i$), l is total number of artist attributes (AA), and $V_{AA_i}$ is the value of each individual artist ($AA_i$).

In yet other embodiment, the digital collectible platform 101 can consider individual weights of the different items or parameters/attributes when computing the dynamic value metric 107. In this way, the digital collectible platform 101 can account for differential effects that different items/parameters have on the dynamic value metric 107. For example, the value of one promotional item may have a bigger effect on the dynamic value metric 107 than another promotional item, or the value of one object attribute (e.g., provenance) may have a bigger effect on the dynamic value metric 107 than another object attribute (e.g., color). Accordingly, the following is another but not exclusive example equation that can be used to compute the dynamic value metric 107:

$$V_{Card} = \sum_{i=1}^{n} w_{PI_i} V_{PI_i} + \sum_{i=1}^{m} w_{S_i} V_{S_i} + \sum_{i=1}^{j} w_{C_i} V_{C_i} + \sum_{i=1}^{k} W_{SA_i} V_{SA_i} + \sum_{i=1}^{l} W_{AA_i} V_{AA_i}$$

where $V_{Card}$ is the dynamic value metric 107 of the object 103, n is total number of promotional items (PI), $V_{PI_i}$ is the value of each individual promotional item ($PI_i$), $w_{PI_i}$ is the weight for each individual promotional item ($PI_i$), m is total number of services (S) or tasks included or otherwise available from the subject, $V_{S_i}$ is the value of each individual service ($S_i$), $w_{S_i}$ is the weight for each individual service ($S_i$), j is total number of included content items (C), $V_{C_i}$ is the value of each individual content item ($C_i$), $w_{C_i}$ is the weight for each individual content item ($C_i$), k is total number of subject attributes (SA), $V_{SA_i}$ is the value of each individual subject attribute ($SA_i$), $W_{SA_i}$ is the weight for each individual subject attribute ($SA_i$), l is total number of artist attributes (AA), $V_{AA_i}$ is the value of each individual artist (AA), and $w_{AA_i}$ is the weight for each individual subject attribute ($AA_i$).

It is noted that the above equations are provided by way of illustration and not as limitations. It is contemplated that any equivalent equation or algorithm can be used to compute the dynamic value metric 107 for an object 103.

In alternative embodiments, instead of a heuristic or equation-based approach, the digital collectible platform 101 can use machine learning to predict the dynamic value metric 107. More specifically, the digital collectible platform 101 can compute input features based on the query results from the one or more of the sponsorship data 123, services data 125, object data 121, artist data 129, content providers 117, or services platform 113. The input features can then be fed into a machine learning model that has been trained to predict the dynamic value metric 107 (e.g., the output of the trained machine learning model).

In one embodiment, the machine learning model can be trained using a training data set comprising examples of object features that have been labeled with corresponding value metrics 121. This labeled data is used as the ground truth data for training. Multiple different loss functions and/or supervision schemes can be used alternatively or together to train the machine learning model to predict the dynamic value metric 107 for an object 103. One example scheme is based on supervised learning. For example, in supervised learning, the system 100 can incorporate a learning model (e.g., a logistic regression model, Random Forest model, and/or any equivalent model) to train the machine learning model to make predictions (e.g., predictions of the dynamic value metric 107) from input features. During training, the system 100 can feed feature sets from a training data set into the machine learning model to compute a predicted value metric 107 using an initial set of model parameters. The system 100 then compares the predicted matching probability and value metric 107 to ground truth data in the training data set for each training example used for training. The system 100 then computes an accuracy of the predictions (e.g., via a loss function) for the initial set of model parameters. If the accuracy or level of performance does not meet a threshold or configured level, the system 100 incrementally adjusts the model parameters until the machine learning model generates predictions at a desired or configured level of accuracy with respect to the annotated labels in the training data (e.g., the ground truth data). In other words, a "trained" machine learning model has model parameters adjusted to make accurate predictions (e.g., predictions of the dynamic value metric 107) with respect to the training data set (e.g., object features and their labeled ground truth values). In the case of a neural network, the model paraments can include, but are not limited to, the coefficients or weights and biases assigned to each connection between neurons in the layers of the neural network.

After the digital collectible platform 101 computes the dynamic value metric 107 (e.g., via the heuristic approach, machine learning-based approach, or equivalent as described above), the dynamic value metric 107 can be transmitted to the application 135 (e.g., via message 427) to update the rendering of the dynamic value metric 107 in the digital representation 105 in the user interface 133 and/or store the computed value metric 107 in the dynamic value metric database, content data 127, or equivalent database for later access (e.g., via message 429).

In one embodiment, the digital collectible platform 101 stores data records indicating redeemable promotional/sponsored items (sponsorship data 123) and/or services (e.g., services data 125) that are included or otherwise available for a subject of the object 103 to perform (e.g., in return for a fee payment to the subject). These redeemable items and/or services can be tracked according to the various embodiments of FIGS. 5 and 6 described below. As used herein, the term "redeemable" refers to being able to present the object 103 in exchange for an item or service for free or at a discount.

Figure 5:
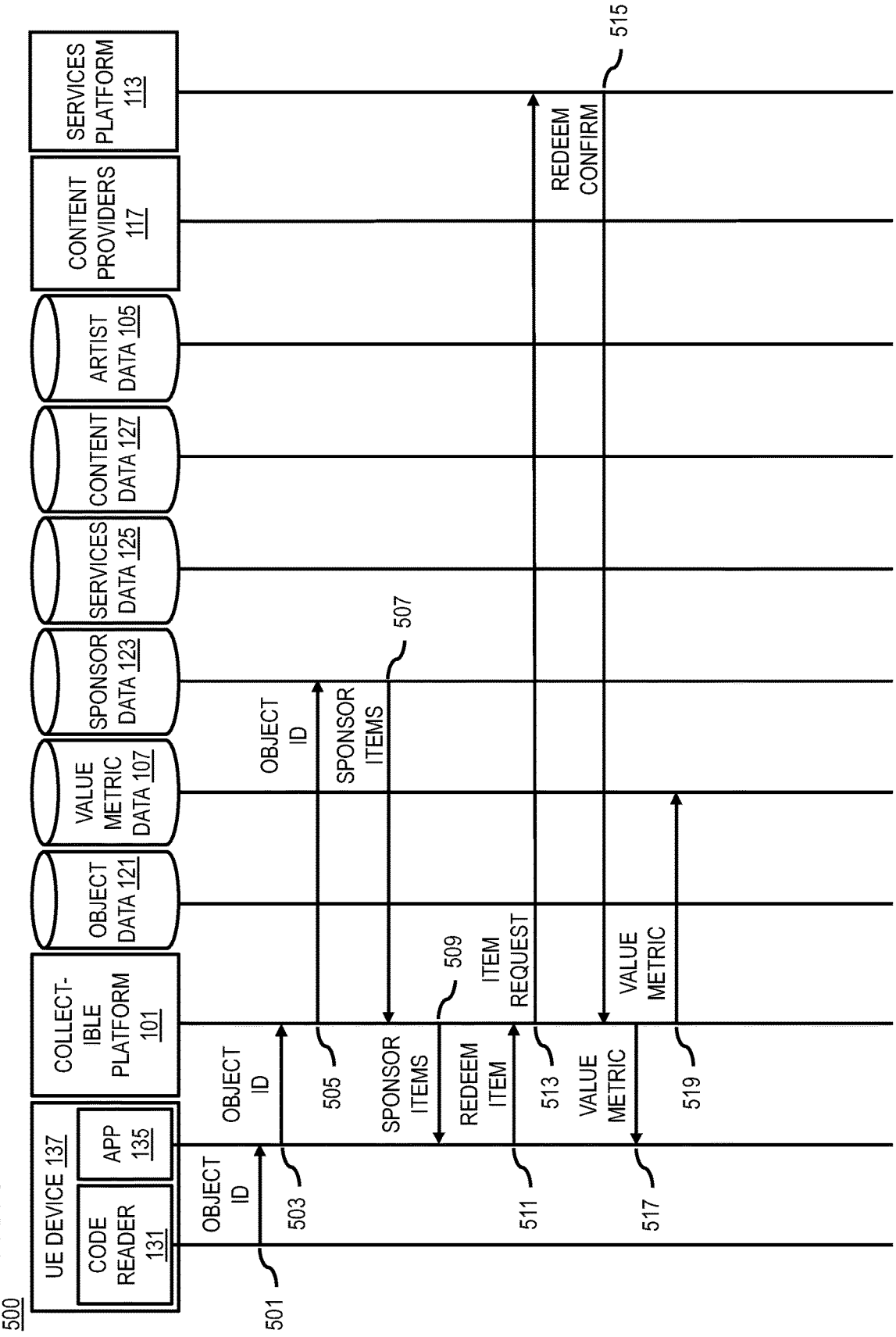
FIG. 5 is a time-sequence diagram that illustrates a sequence of messages and processes between system components for confirming redemption of an item associated with an object, according to one example embodiment.

FIG. 5 is a time-sequence diagram 500 that illustrates a sequence of messages and processes between system components for confirming redemption of an item associated with a trading card, according to one example embodiment. A message that is passed from one process to another is represented by horizontal arrows. The processes represented in FIG. 5 are a UE 137 associated with a code reader 131 and application 135, the digital collectible platform 101, content data 127, value metric data 107, sponsorship data 123, services data 125, object data 121, artist data 129, content providers 117, and services platform 113.

In one embodiment, the time-sequence diagram 500 starts similarly to the time-sequence diagram 400 of FIG. 4. For example, the time-sequence diagram 500 starts with the code reader 131 (e.g., associated with UE 137) determining an object identifier associated with an object 103 of interest and passing the object identifier to the application 135 (e.g., via message 501). The application 135 then initiates a request (specifying the object identifier) to the digital collectible platform 101 to determine what promotional items are included with the object 103 of interest (e.g., via message 503). The digital collectible platform 101 uses the received object identifier to query the sponsorship data 123 for information on promotional items available for the associated object identifier (e.g., via message 505). The query results comprising, at least in part, a list of promotional/sponsored items for the object 103 is returned to the digital collectible platform 101 (e.g., via message 507). The digital collectible platform 101 transmits the list of available promotional items to the application 135 for presentation in the digital representation 105 for the object 103 of interest (e.g., via message 509).

In one embodiment, a consumer can interact with the digital representation 105 to select one or more promotional/sponsored items for redemption (e.g., as illustrated in FIG. 2C above) and transmits the selected item(s) to the digital collectible platform 101 for processing (e.g., via message 511). In response, the digital collectible platform 101 generates an item redemption request and transmits the request to a services platform 113 (or service 115 of the services platform such as but not limited to a shopping service, electronic storefront, fulfillment center, and/or the like) to fulfill the item request (e.g., via message 513). The services platform 113 processes the redemption request to fulfill the order and responds to the digital collectible platform 101 (and/or directly to the application 135) with a redemption confirmation (e.g., an order receipt) (e.g., via message 515).

In one embodiment, the digital collectible platform 101 can update the dynamic value metric 107 of the object 103 (if needed or configured to perform the update) based on the item redemption (e.g., subtract the value of the redeemed item from the dynamic value metric 107 of the card). The updated value metric 107 can be transmitted to the application 135 for presentation in the digital representation 105 of the object 103 (e.g., via message 517). In addition or alternatively, the updated value metric 107 can be stored in the dynamic value metric database and/or content data 127 for later access (e.g., via message 519).

Figure 6:
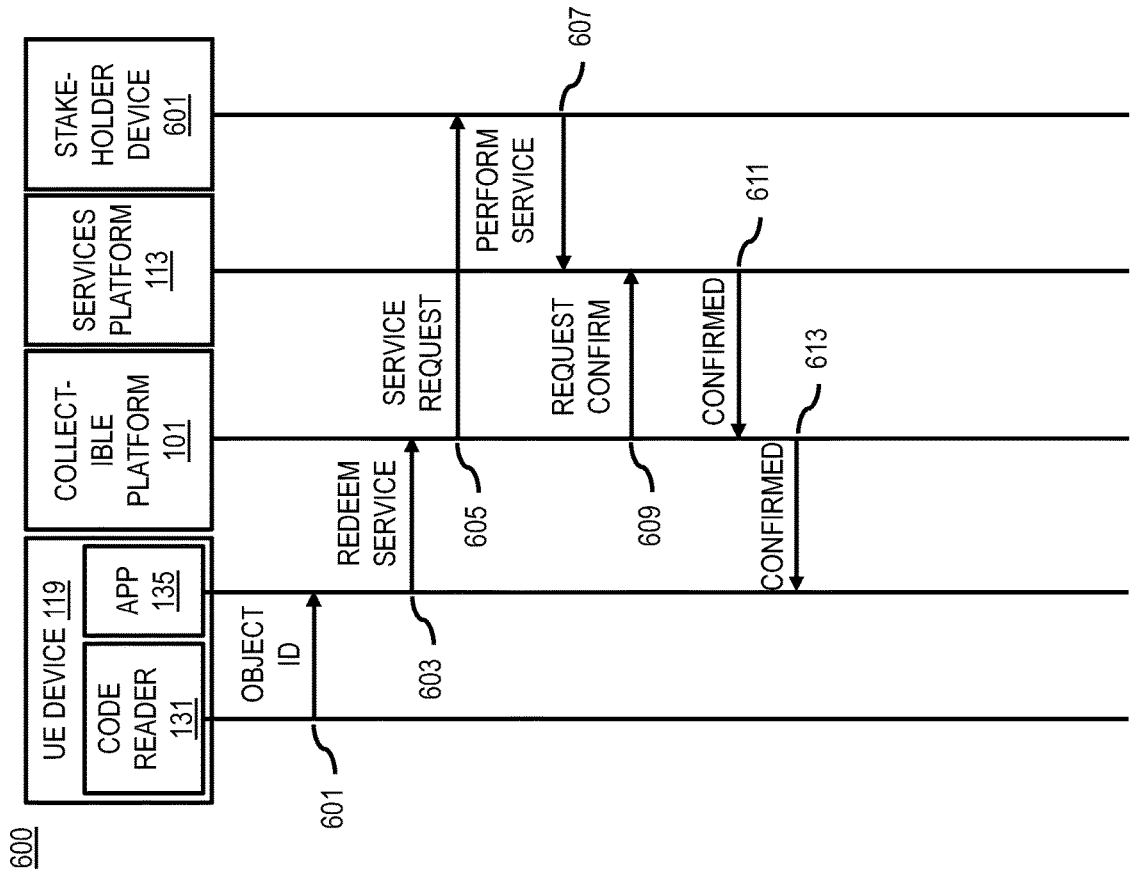
FIG. 6 is a time-sequence diagram that illustrates a sequence of messages and processes between system components for confirming performance of a service or task associated with an object, according to one example embodiment.

FIG. 6 is a time-sequence diagram 600 that illustrates a sequence of messages and processes between system components for confirming performance of a service associated with a trading card, according to one example embodiment. A message that is passed from one process to another is represented by horizontal arrows. The processes represented in FIG. 6 are a UE 137 associated with a code reader 131 and application 135, the digital collectible platform 101, services platform 113, and a subject device 601 (e.g., a UE 137 associated with or otherwise used by a subject).

The example FIG. 6 assumes that the code reader 131 has read the object identifier from an object 103 of interest and provided the object identifier to the application 135 (e.g., via message 601). The application 135 has also presented a digital representation 105 of the object 103 that includes a UI element for redeeming one or more services displayed in the digital representation 105. One example of a service includes but is not limited to the service or task (e.g., post a social media comment about the object 103) listed in UI element 205 of the digital representation 105 illustrated in FIG. 2A. A consumer can select to redeem the service (e.g., post social media comment) in the digital representation 105 (e.g., via message 603).

In response to the service redemption request, the digital collectible platform 101 sends a service request to the stakeholder who is to perform the task or service (e.g., via message 605 transmitted to the stakeholder's device 601). The service request, for instance, can specify the service or task to be performed and the details of how the service is to be performed (e.g., date, time, target person, service to use, etc.). In the example of posting a social media comment about an object 103, the service redemption request can specify the social media service to use, the feed or community in which to post the comment, social media handle information, date and time to post, etc. In one embodiment, the communications between the task (e.g., social media post) can occur via a proxy communication service provided by the digital collectible platform 101. For example, the proxy communication service can assign proxy phone accounts to both the stakeholder to provide privacy and avoid exposing the actual account information. The stakeholder can then use the stakeholder device 601 to perform the requested service or task via the proxy service of the services platform 113 (e.g., via message 607).

In one embodiment, the digital collectible platform 101 can confirm that the service was completed by querying the services platform 113 (e.g., via message 609). For example, if the service is a social media post, the digital collectible platform 101 can query the social media service (e.g., a service 115 of the services platform 113) to determine whether a social media post as specified by the service was created at or near (e.g., with a threshold time window) of the scheduled time. In response, the services platform 113 can provide confirmation of the completion of the service and send the confirmation to the digital collectible platform 101 (e.g., via message 611) and/or the application 135 (e.g., via message 613).

FIG. 7 is a diagram illustrating an example of a digital representation 105 of an object 103 listing available services or tasks, according to one example embodiment. The example digital representation 105 of FIG. 7 continues the examples of FIGS. 2A-2C and provides another screen of the digital representation 105 that includes a UI element 701 of available services or tasks to perform. More specifically, the UI element 701 lists the services 703 or tasks that the is configured for the object 103 to be performed to increase its dynamic value metric. In one embodiment, the digital collectible platform 101 retrieves the services data 125 for the trading card and provides it to the application 135 of the UE device 137 for rendering the digital representation. As shown, in this example, the object "Classic Car" is associated with a range of communication tasks that can be performed by a stakeholder to increase the dynamic value metric of the object 103 (e.g., by a sponsor providing additional redeemable items, increasing popularity and exposure, linking to collaborative partners, etc.). Examples of these services or tasks include but are not limited to performing a voice recording, call, social post, text message, creation of a video, taking of a picture, participation on a video call, autograph, engagement in a meet and greet event, and/or accessing a collaborative link (e.g., between content creators/providers associated with the object 103). Each of these available services or tasks can be rendered in the digital representation 105 with an interactive control element for a stakeholder to request to perform any of the services.

As described with respect to the various embodiments of FIG. 6, the digital collectible platform 101 can provide proxy communication services 705 (e.g., proxy social media accounts, phone/text relays via anonymized phone numbers or numbers identifying as the digital collectible platform 101). In one embodiment, the digital collectible platform 101 can provide first party services for one or more of the proxy communication services 703. In addition or alternatively, the proxy communication services 705 can be third party services provided by the services platform 113 and/or any of its services 115. In some embodiments, the services platform 113 can also provide connectivity to social media services and/or any other service/application for performing one or more of the available services listed in the digital representation 105 of the object 103 for delivery, access, connectivity, etc. to the requesting consumer's device (e.g., a UE 137 executing client application(s) 135). In one embodiment, the services associated with an object 103 can be renewed between each subsequent object owner (e.g., for a designated number of renewals, expiration period, etc.), can be transferred to a new object owner only if not used, or can be nontransferable depending on the preferences of sponsors, owners, the digital collectible platform 101, other platform user, and/or any other designated stakeholder.

In on embodiment, a sponsor can increase the dynamic value metric of an object 103 by implementing a gamification strategy that ties completion of specific tasks to increased sponsorship of the object 103. For instance, the sponsor may incentivize users to engage with the object 103 by completing tasks such as sharing social media posts related to the object, clicking on collaborative links, or participating in community activities. As users complete these tasks, the sponsor can offer increased sponsored items, value, etc. that contribute to the object 103's dynamic value metric. The sponsor can then pledge additional sponsorship funds or resources based on the level of user engagement and participation, effectively increasing the object's perceived value. By gamifying user interactions and incentivizing engagement through sponsorship incentives, the sponsor not only boosts the object's dynamic value metric but also fosters a vibrant and active community around the object, driving further interest and investment in its ecosystem.

By way of example, the use of collaborative links serves as a tool to introduce users from one content creator to other related content creators, consequently amplifying exposure for all participating creators and enhancing the value of the object 103 they are associated with. By leveraging collaborative links, content creators can cross-promote each other's work related to an object 103, allowing users to discover new content, communities, or services within the same ecosystem. As users explore related content and engage with multiple creators, they not only expand their knowledge and interests about a particular object 103 but also contribute to increased visibility and recognition for the participating creators. This heightened exposure not only benefits individual creators but also augments the dynamic value of the object 103 they are associated with, as it becomes integrated into a larger network of content and collaborations. Furthermore, as users navigate through interconnected content and communities via collaborative links, they form deeper connections and attachments to the object 103, thereby enhancing its overall dynamic value in the digital ecosystem.

Figure 8:
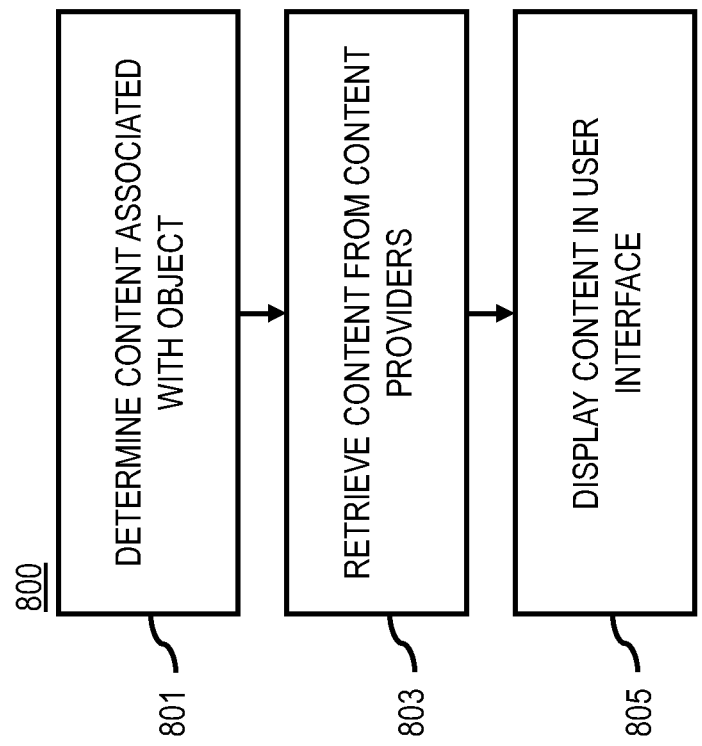
FIG. 8 is a flowchart of a process for presenting content associated with an object, according to one example embodiment.

FIG. 8 is a flowchart of a process 800 for presenting content associated with an object 103, according to one example embodiment. In various example embodiments, the digital collectible platform 101 alone or in combination with the application 135 may perform one or more portions of a process 800 and may be implemented in/by various means, for instance, a chip set including a processor and a memory as shown in FIG. 18 or in a circuitry, hardware, firmware, software, or in any combination thereof. In one example embodiment, the circuitry includes but is not limited to processing circuitry, code reading circuitry, and output circuitry. As such, the system 100, digital collectible platform 101, application 135, and/or any associated apparatus, device, circuitry, system, computer program product, and/or non-transitory computer readable medium can provide means for accomplishing various parts of the process 800, as well as means for accomplishing embodiments of other processes described herein. Although the process 800 is illustrated and described as a sequence of steps, it is contemplated that various embodiments of the process 800 may be performed in any order or combination and need not include all of the illustrated steps.

In one embodiment, the system 100 introduces a capability to integrate content provided content providers 117 directly into a UI element of the digital representation 105 of the object 103. In this use case, the object 103 and/or its digital representation 105 acts as an access and/or authentication key to initiate delivery of the content from content providers 117. As used herein, the term "content from content providers 117" can include but is not limited to programming restricted social media feeds, restricted social media communities, content, broadcast content, streaming content, pay-per-view content, and/or the like.

Accordingly, in step 801, an apparatus (e.g., associated with the digital collectible platform 101, application 135, and/or equivalent components) determines or is otherwise configured to determine content from one or more content providers 117 associated with the object 103 (e.g., content data 127). In one embodiment, the content that is associated with an object 103 can be based on one or more sponsorship arrangements (e.g., providing content for the subject, a school associated with the subject, a sports league associated with the subject, etc.) as recorded in the sponsorship data 123.

In step 803, the application is further configured to retrieve the content from one or more content management systems of the one or more content providers 117. By way of example, a content management system can include servers, data centers, etc. storing a content provider's programming/broadcast/streaming/etc. content for delivery to end user devices (e.g., UE 137).

In one embodiment, the apparatus is further configured to determine an access right to the content based on the object identifier, a registration of the object identifier to a user account, or combination thereof. In other words, the retrieval and/or presentation of the content in the digital representation 105 can be limited or authorized based on an identifier or other equivalent authentication key associated with the object 103 and/or it's digital representation 105. In this way, the retrieving, the displaying, or a combination thereof of the content is based on the access right associated with the object 103.

In one embodiment, ownership of an object 103 associated with an object identifier can serve as a means to grant access to restricted social media feeds and communities, providing a unique avenue for fostering engagement and community interaction. Through the digital collectible platform 101 integrated with the object's identifier, owners or bearers of the object 103 can be verified and authenticated, thereby gaining eligibility for access to exclusive content or communities. This verification process ensures that only individuals with a legitimate connection to the object 103 can participate in the restricted social media spaces, enhancing security and privacy within these communities. Furthermore, leveraging ownership as a criterion for access promotes a sense of exclusivity and affinity among participants, as they share a common bond or interest tied to the object 103. By linking ownership of the object 103 with access privileges to events, restricted social media feeds and communities, the digital collectible platform 101 can create a cohesive ecosystem that fosters deeper engagement, collaboration, and interaction among stakeholders associated with particular objects 103.

In step 805, the application is further configured to display the content in the user interface 133 associated with the functions of the digital collectible platform 101. In one embodiment, the content is displayed in a user interface element that is rendered within the digital representation 105 of the object 103. For example, as shown in the example of FIG. 2B, the content can be rendered in UI element 223 of the digital representation 105. In other words, the digital representation 105 of the object 103 acts as the frontend or client for the content provided by the content providers 117.

Figure 9:
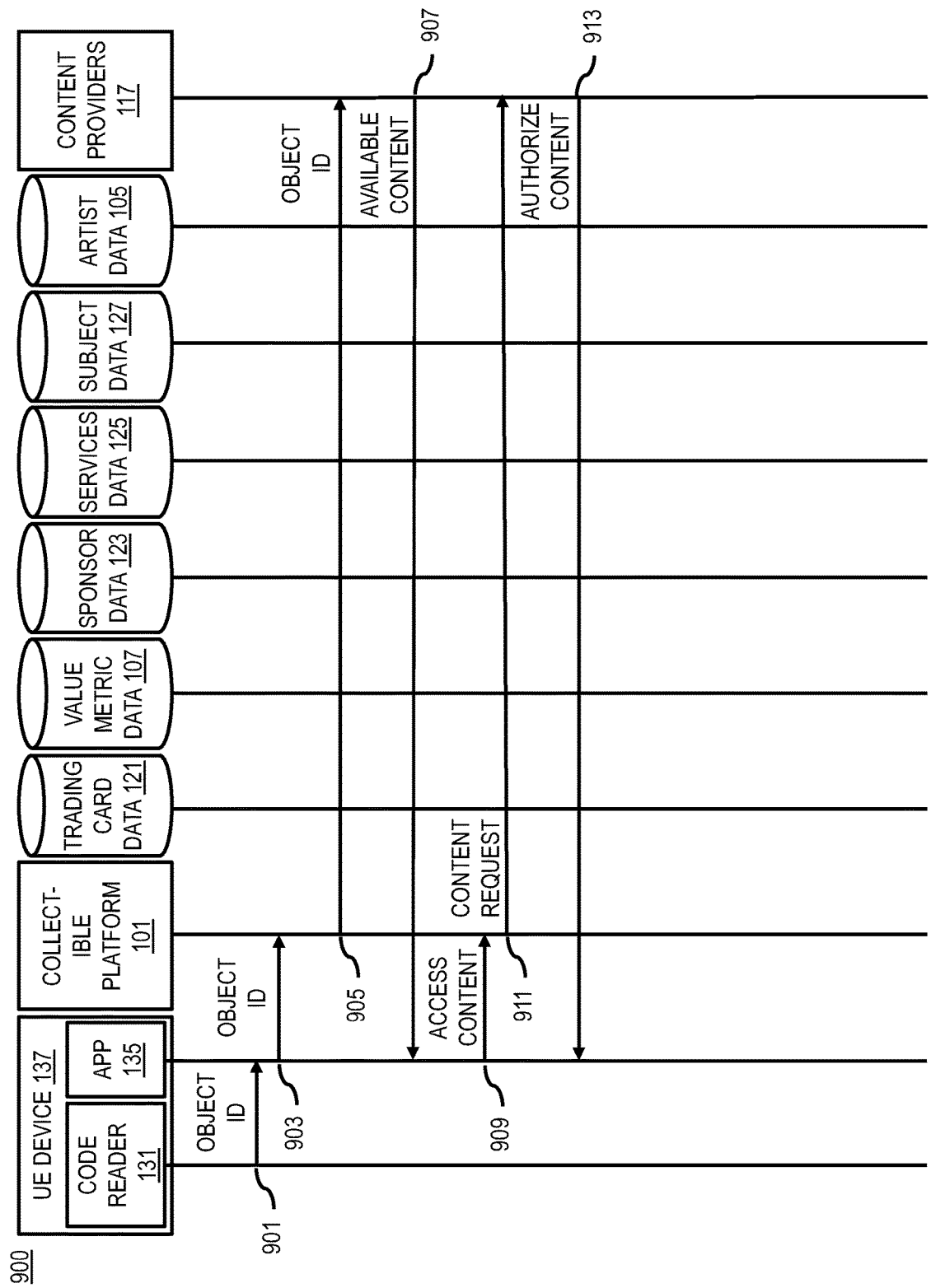
FIG. 9 is a time-sequence diagram that illustrates a sequence of messages and processes between system components for retrieving and displaying content associated with an object, according to one example embodiment.

Additional details of various embodiments of this trading card-based content delivery process are described with respect to FIG. 9. FIG. 9 is a time-sequence diagram 900 that illustrates a sequence of messages and processes between system components for retrieving and displaying content associated with a trading card, according to one example embodiment. A message that is passed from one process to another is represented by horizontal arrows. The processes represented in FIG. 4 are a UE 137 associated with a code reader 131 and application 135, the digital collectible platform 101, content data 127, value metric data 107, sponsorship data 123, services data 125, object data 121, artist data 129, and content providers 117.

In one embodiment, the time-sequence diagram 900 starts with the code reader 131 (e.g., associated with UE 137) determining an object identifier associated with an object 103 of interest and passing the object identifier to the application 135 (e.g., via message 901). The application 135 then initiates a request (specifying the object identifier) to the digital collectible platform 101 to determine what content is available to be presented in the digital representation 105 of the object 103 of interest (e.g., via message 903). The digital collectible platform 101 uses the received object identifier to query content providers 117 (and/or the sponsorship data 123 in some embodiments) for information on what content is available for the associated object identifier (e.g., via message 905). The query results comprising, at least in part, a list available content for the object 103 is returned to the application 135 and/or the digital collectible platform 101 (e.g., via message 907). For example, the application 135 can display a thumbnail picture, icon, or other equivalent representation in a UI element of the digital representation 105 to indicate an availability of the content. In one embodiment, the application 135 also includes the capability to organize and present objects 103 and their associated content by categories or albums. This feature enhances user experience by facilitating easier organization, navigation, and discovery of objects 103. By categorizing objects 103 and their related content, users can quickly locate items of interest based on specific themes, topics, or attributes. For example, objects 103 and/or their content may be categorized by genre, type, date, popularity, user-defined tags, and/or the like.

The object owner or other stakeholder can then interact with the UI element of the digital representation 105 (e.g., click on a play button in the UI element) to request access to, playback, streaming, etc. of one or more of the content (e.g., via message 909). The content access request can be relayed to the digital collectible platform 101 or transmitted directly to the content provider 117 to initiate the streaming (e.g., via message 911). On receiving the content access request, the content provider 117 can authorize the request and then initiate delivery of the content to the application 135 for presentation in the UI element of the digital representation 105 (e.g., via message 913). As described above, in one embodiment, authorizing the request comprises determining an access right as described in the various embodiments above. For example, the authorization process can include but is not limited to determining whether the object identifier or a derivative of the object identifier is on a permitted access list maintained by the content provider 117 and/or the digital collectible platform 101. It is noted that this example of authorizing access is provided by way of illustration and not as a limitation. It is contemplated that any equivalent means of authorizing access based on the object 103 and/or its digital representation 105 can be used according to various embodiments described herein.

Figure 10:
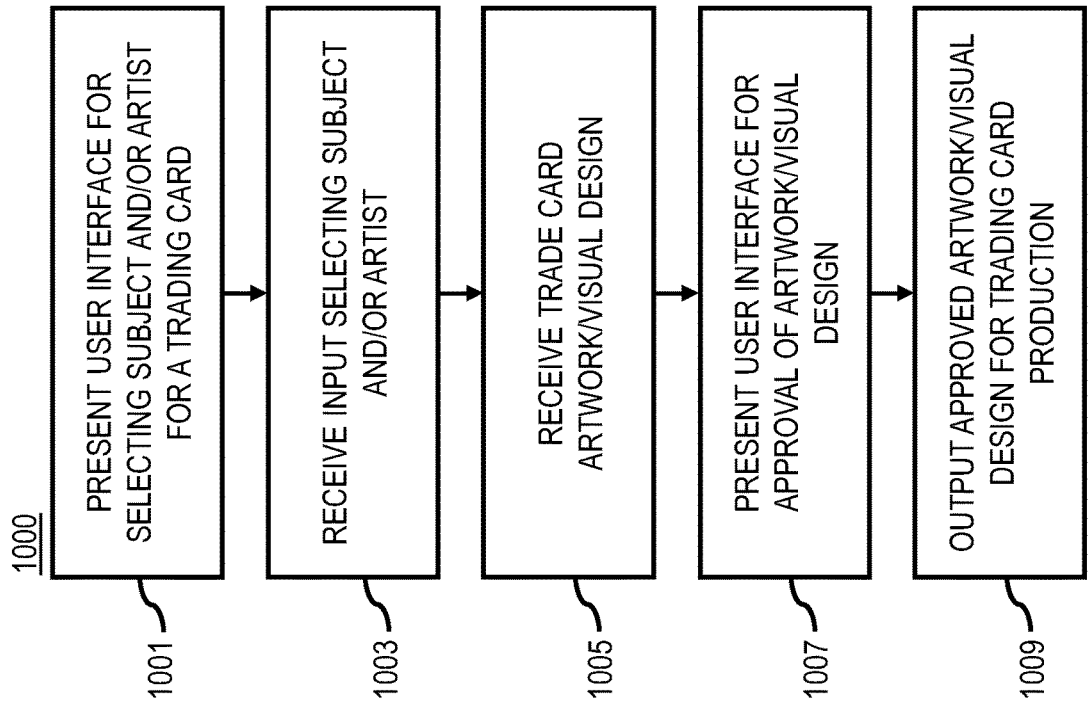
FIG. 10 is a flowchart of a process for selecting an object and/or artist for creating a digital representation of the object, according to one example embodiment.

In one embodiment, the digital collectible platform 101 provides a platform to facilitate matching objects 103 and artists to create a digital representation 105 of the object 103. FIG. 10 is a flowchart of a process for selecting an object 103 and/or artist for creating a digital representation 105, according to one example embodiment. In various example embodiments, the digital collectible platform 101 alone or in combination with the application 135 may perform one or more portions of a process 1000 and may be implemented in/by various means, for instance, a chip set including a processor and a memory as shown in FIG. 18 or in a circuitry, hardware, firmware, software, or in any combination thereof. In one example embodiment, the circuitry includes but is not limited to processing circuitry, code reading circuitry, and output circuitry. As such, the system 100, digital collectible platform 101, application 135, and/or any associated apparatus, device, circuitry, system, computer program product, and/or non-transitory computer readable medium can provide means for accomplishing various parts of the process 1000, as well as means for accomplishing embodiments of other processes described herein. Although the process 1000 is illustrated and described as a sequence of steps, it is contemplated that various embodiments of the process 1000 may be performed in any order or combination and need not include all of the illustrated steps.

In the development of a digital representation 105 of an object 103, the coordination of what object to represent and what artist to create the artwork or visual design of the digital representation 105 of the object 103 can be a difficult task, particularly at scale. The various embodiments of the process 1000 illustrate technical solutions for managing the object/artist selection process as well as the workflow for reviewing and approving the associated artwork of the digital representation of the object 103. The process 1000 is described with reference to FIGS. 11A-11C which are diagrams illustrating example user interfaces for selecting a subject and/or artist for creating a trading card, according to one example embodiment.

In step 1001, the system 100 and/or related apparatuses (e.g., associated with the digital collectible platform 101 and/or application 135) present or are configured to present a digital representation creation user interface comprising one or more user interface elements to select an artist to create a visual design of the digital representation 105 of the object 103. In addition or alternatively, the application is further configured to present a digital representation creation user interface comprising one or more user interface elements for an artist that is to create a visual design of the digital representation 105 to select object 103 to depict.

In other words, the system 100 provides respective user interfaces and interactions to mediate the interaction and selection of objects 103 and artists for creating digital representations 105. For example, FIG. 11A illustrates a UI 1101 for an object owner or any other user to select an artist to create a digital representation 105 of an object 103. As shown, the UI 1101 has a UI element 1103 displaying a picture or avatar of the artist (e.g., "Jane Doe" in this example) and controls for scrolling between available artists (e.g., "<" to scroll left and ">" to scroll right). The UI 1101 also has a UI element 1105 displaying biographical information about the artist including attributes such as but not limited to: name, school/organizational affiliation, art style, rating, background information, artwork, and availability.

The UI 1101 further has a UI element 1107 of artwork samples created by the artist, and a UI element 1109 to select the artist for creating an object 103. The artist information, for instance, can be queried from the artist data 129 and presented in the UI 1101 and its UI elements. In one embodiment, the artist selection UI 1101 can be presented on a device (e.g., UE 137) associated with the subject or any other user who is searching for artists to create artwork for an object 103.

FIG. 11B illustrates a UI 1121 for the opposite use case of FIG. 11A and can be used by an artist or any other user who is searching for an object 103 to depict in a digital representation 105. As shown, the UI 1121 has a UI element 1123 displaying a picture or avatar of the object 103 (e.g., a "Classic Car" in this example) and controls for scrolling between available objects 103 (e.g., "<" to scroll left and ">" to scroll right). The UI 1121 also has a UI element 1125 displaying information about the object 103 (e.g., "Vintage collectible car from the 1950a with 5 official races") and its availability. The UI 1121 further has a UI element 1127 of any other digital representations 105 depicting the same object 103, and a UI element 1129 to select the object 103 to start the creation of the corresponding digital representation 105. The object information, for instance, can be queried from the object data 121 and presented in the UI 1121 and its UI elements. In one embodiment, the object selection UI 1121 can be presented on a device (e.g., UE 137) associated with the artist or any other user who is searching for objects 103 to create a digital representation 105.

In one embodiment, the digital collectible platform 101 can present either or both of the artist selection UI 1101 and the object selection UI 1121 depending on the configuration of the system 100. For example, to enable selection of the objects and subjects, both UIs 1101 and 1121 can be presented. On the other hand, an artist-centric implementation may present only the object selection UI 1121 so that only artists control what objects 103 they will depict, and a object-centric implementation may present only the artist selection UI 1101 so that only object owner's control who their artists will be.

In step 1003, the digital collectible platform 101 receives or is configured to receive an input for selecting objects 103 and/or artists via the respective UIs 1121 and 1101. For example, the input can be received as an interaction (e.g., a click, touch, or other selection action) on the UI elements configured to indicate a selection (e.g., UI element 1109 of UI 1101 to select an artist and UI element 1129 of UI 1121 to select an object 103). After selection of the artist and/or object 103, the digital collectible platform 101 stores the selection, for instance, the in content data 127 associated with the object 103 to be created. The digital collectible platform 101 can transmit confirmation of the selection to the respective devices (e.g., UEs 137) of the selected artist and/or owner/stakeholder of the selected object 103.

In step 1005, the digital collectible platform 101 is configured to receive trading card artwork/visual design. In one embodiment, on being selected, the digital collectible platform 101 instructs the artist to prepare artwork for review and approval. The review and approval can be performed by the owner of the object 103 and/or any other user (e.g., a representative of the provider of the digital collectible platform 101, a sponsor or potential sponsor, etc.) designated by the digital collectible platform 101. Accordingly, in one embodiment, the digital collectible platform 101 is configured to receive the review draft of the artwork. If the artwork is in digital format, the artwork can be received directly by the digital collectible platform 101 and stored in the content data 127 and/or artist data 129. If the artwork is in a physical format, the artist can use the application 135 executing on the UE 137 or any other equivalent application or device to configure the physical artwork into digital artwork for storage in the content data 127 and/or artist data 129.

In step 1007, the digital collectible platform 101 presents or is configured to present a user interface for approval of the artwork/visual design of an object 103 submitted by the artist. Per the various embodiments discussed in step 1005, the approval user interface can be presented on a device (e.g., UE 137) associated with any selected approving authority including but not limited to the object owner and/or any other designated reviewer/approval. FIG. 11C illustrates an example artwork approval UI 1141. In this example, the UI 1141 includes a UI element 1143 identifying the object 103, a UI element 1145 displaying the artwork to be reviewed and identifying the artist, and UI element 1147 presenting approval elements (e.g., an element to request modification of the artwork and an element to approve the artwork as presented).

In one embodiment, in addition or as an alternate to the manual review process described in the embodiments above, the digital collectible platform 101 perform automated review using, for instance, a machine learning model that accepts the artwork as an image (e.g., scaled to a resolution compatible input of the machine learning model) and outputs classifications of potential features of concern that could result a request to modify the artwork or to reject the artwork complete. For example, the machine learning model can be trained to detect the depiction of items or objects that can potentially infringe on the intellectual property rights of others (e.g., presence of unlicensed trademarks, logos, images, etc.) as well as authenticity and other prohibited categories (e.g., products, objects, etc. prohibited by the NCAA NIL policy, the object owner, the provider of the digital collectible platform 101, etc.).

In step 1009, after review and approval, the digital collectible platform 101 outputs or is configured to output the approved artwork/visual design for production of the digital representation 105. For example, the digital collectible platform 101 can store the approved artwork in the content data 127 with a flag or other database field indicating that the artwork is approved and ready for production.

In one embodiment, the digital collectible platform 101 is a comprehensive platform that includes functions for different types of users involved in the trading card process. These users include but are not limited to object owners, artists, consumers, corporations or other sponsors, and the like. FIGS. 12-16 are process flows directed to functions of the digital collectible platform 101 that are specific to the different types of users.

Figure 12:
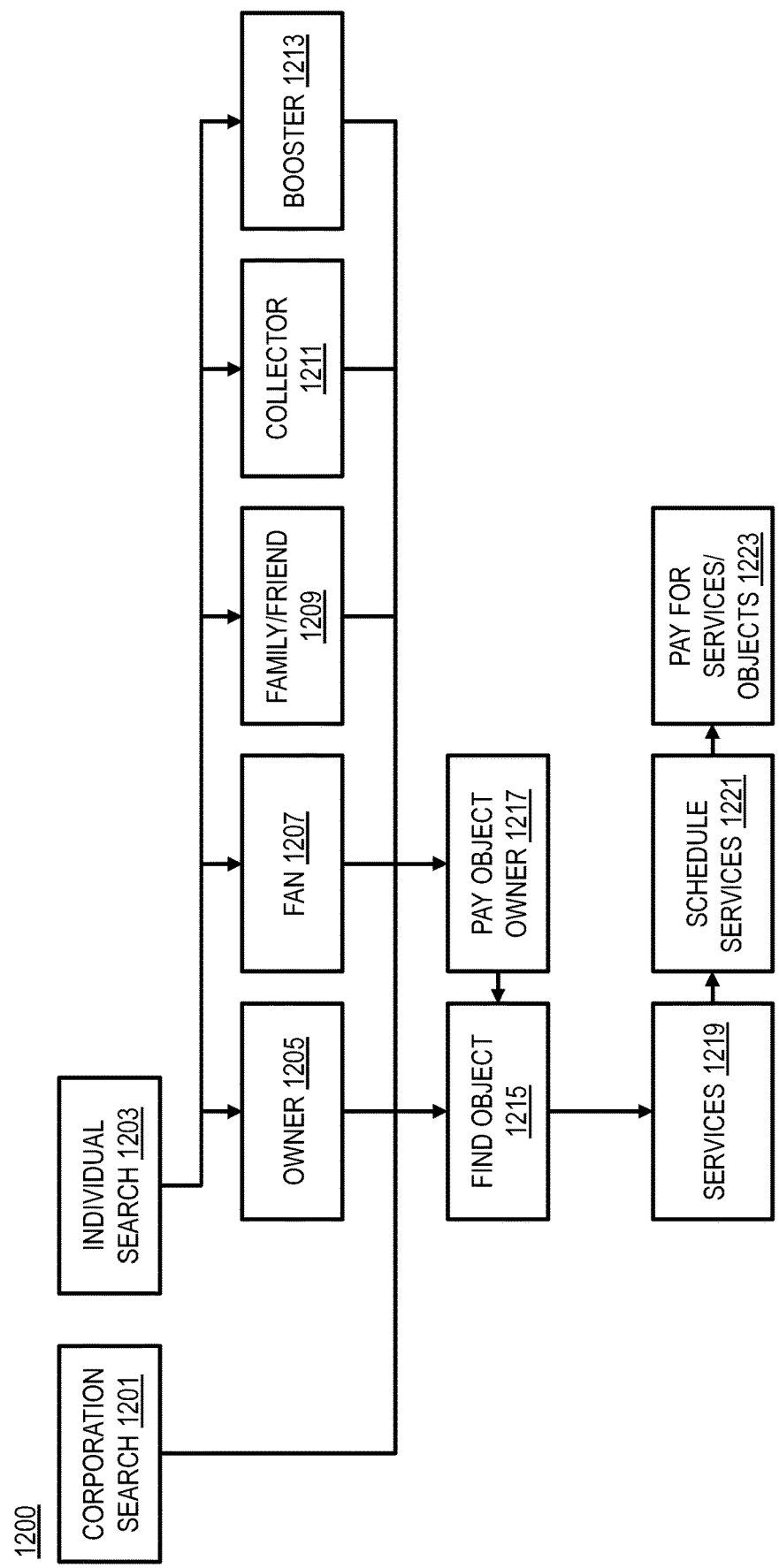
FIG. 12 is a diagram of a process flow of a digital collectible platform for searching for an object, according to one example embodiment.

FIG. 12 is a diagram of a process flow 1200 of the digital collectible platform 101 for searching for an object 103, according to one example embodiment. The digital collectible platform 101 separates the process flow 1200 into two general search categories: (1) a corporation/sponsor search 1201 process flow directed to entities/persons who want the object 103 for marketing purposes; and (2) individual search 1203 for individuals with differing intended uses of the digital collectible platform 101. Because of the different intended uses of individuals, the individual search 1203 can be further subcategorized by individual types: (1) owner 1205 who owns a particular object 103; (2) fans 1207 who want to support the object 103; (3) family members and friends 1209 who want to support individual objects 103 because they are related or are friends of the object owner/stakeholder; (4) collectors 1211 who are searching for specific objects 103; and (5) boosters 1213 who want to support the general collectible object class.

In one embodiment, the digital collectible platform 101 provides search user interfaces and functions specific to each of the types of users into functional categories: (1) a function 1215 to find a object; and (3) a function 1217 to pay or support an object 103 or object owner. For example, the find object function 1215 provides a search user interface that can query for objects 103 by attribute stored in the object data 121. Once found, the pay object owner function 1217 provides a user interface for searching for services or tasks 1219 that can be performed or paid for to support the object 103. Examples of the services 1219 include but are not limited to: (1) video recording—making a video of the object 103 for the requesting user; (2) call—making a call about the object 103 to the requesting user; (3) social posts—making social media posts on selected social media services about the object 103 for the requesting user such as but not limited to making comments, following, liking, posting, and/or the like. In one embodiment, the digital collectible platform 101 provides functions and user interfaces such as but not limited to a function 1221 to schedule the requested service(s) and a function 1223 to pay for the requested services and/or objects 103.

For example, in addition to paying for requested services, the function 1223 enables users to pay for selling, buying, and/or trading objects for value. In one embodiment, the function 1123 can include secure mechanisms for payment, ensuring user transactions are conducted safely and efficiently. These mechanisms include a variety of options such as online payment services, cryptocurrency, credit/debit cards, and contactless payment methods. Online payment services, like Venmo or PayPal, offer secure payment processing, encrypting financial information to protect user privacy. Cryptocurrency transactions (e.g., bitcoin, Ethereum, etc.) leverage blockchain technology, providing decentralized and secure payment options for users. Credit/debit cards are commonly used for online transactions, with secure encryption protocols safeguarding sensitive cardholder data. Additionally, contactless payment methods, including Near Field Communication (NFC) and mobile wallets, offer convenient and secure ways to pay for services or objects with minimal physical contact.

Figure 13:
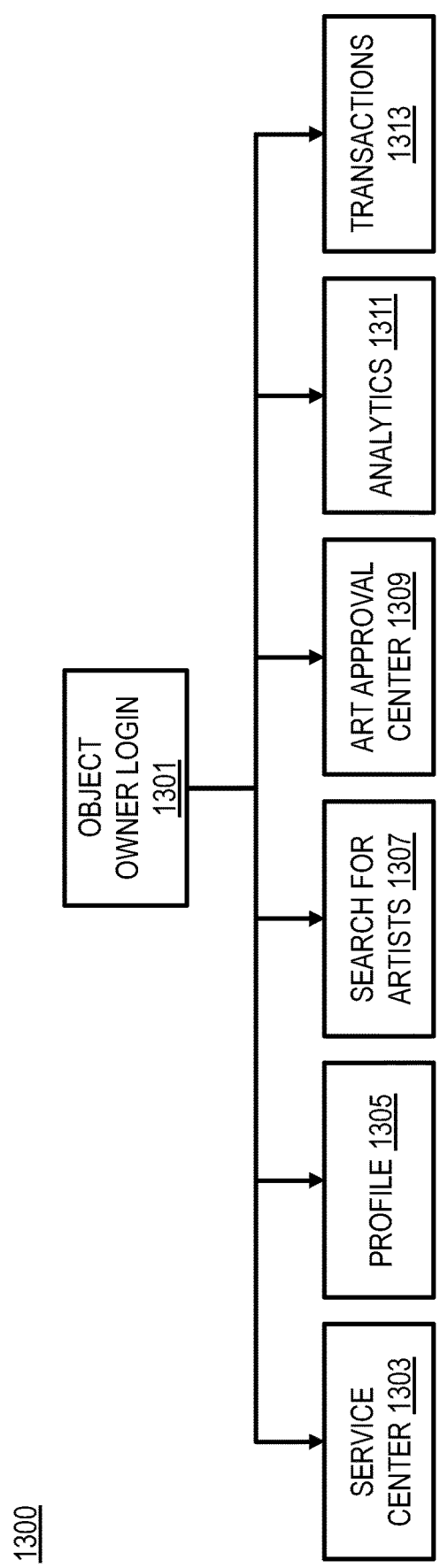
FIG. 13 is a diagram of a process flow for interacting with a digital collectible platform, according to one example embodiment.

FIG. 13 is a diagram of a process flow 1300 for an object owner to interact with the digital collectible platform 101, according to one example embodiment. The digital collectible platform 101 provides a user interface for object owner login 1301 to initiate the process flow 1300. It is contemplated that the digital collectible platform 101 can use any authentication mechanism (e.g., username/password, multi-factor authentication, etc.) to perform object owner login 1301. In one embodiment, once the object owner is logged in, the digital collectible platform 101 can present a service center function 1303 and associated user interfaces. The service center function 1303, for instance, enables the object owner, consumer, or other stakeholder to view service requests from corporations and/or users to perform a request service (e.g., autographs, texts, calls, voice messages, create a video, participate in a live video, take a picture, meet and greet, etc.). The service center function 1301 enables the object owner to review and approve each service request via, for instance, an approval center. The approval center includes functions and related user interfaces for changing prices of the service, approving the service request, or rejecting the service request. If a price change is requested by the object owner, the approval center function also enables the subject to track whether the price has changed and whether the requesting consumer has rejected or accepted the price change. If the object owner approves the request without change, the approval center function enables the object owner or other stakeholder to perform the service and then receive payment for the service from the requesting consumer. If the object owner rejects the request, then the digital collectible platform 101 notifies the requesting consumer of the rejection.

In one embodiment, the digital collectible platform 101 also provides a profile function 1305 for the object owner to edit the object 103's profile information (e.g., stored in object data 121). The profile function 1305 includes, for instance: (1) a sub-function to view the availability status of the object 103 on the digital collectible platform 101; (2) a sub-function to view the object 103's usage statistics on the digital collectible platform 101; (3) a sub-function to support the object 103's related social media networks; (4) a sub-function to specify services or tasks (e.g., autographs, texts, calls, voice messages, create a video, participate in a live video, take a picture, meet and greet, etc.) that the object owner or other stakeholder is to perform; and (5) a sub-function to view other promotional opportunities directed to the object 103.

In one embodiment, the digital collectible platform 101 also provides a search for artists function 1307 and associated user interfaces for the subject to find and engage an artist and an art approval center function 1309. Examples of the functions 1307 and 1309 are described with respect to process 1000 of FIG. 10.

In one embodiment, the digital collectible platform 101 also provides an analytics function 1311 and associated user interfaces for various analytical function such as but not limited to: (1) activity—view activity associated with the object 103 and related services on the digital collectible platform 101; (2) views—monitor the number views of the object 103's profile, services, etc. on the digital collectible platform 101; (3) market value of objects 103—view the dynamic value metric(s) 121 of the objects 103; (4) impressions—view the number of impressions of the digital representations 105 of the objects 103; (5) suggest rates—view the suggested rates for the services or tasks related to the objects 103 as computed by the digital collectible platform 101; (6) engagements—view scheduled or proposed engagements of the objects 103 or related stakeholders; and (7) digital marketing—view digital marketing activities related to the objects 103.

In one embodiment, the digital collectible platform 101 also provides a transactions function 1313 for the user to view transactions in various categories including but not limited to: (1) services—transactions related to services provided by the object owner and/or other stakeholders; (2) auctioned art—transactions related the auctioning of the original artwork used to create the digital representations 105 of the objects 103; (3) apparel—transactions related to apparel; (4) digital marketing sales—sales related to the digital representations 105 of the objects 103; (5) physical sales—sales related to the objects 103 themselves; and (6) limited number of prints—sales of limited prints of the artwork associated with the digital representations 105 of the objects 103.

Figure 14:
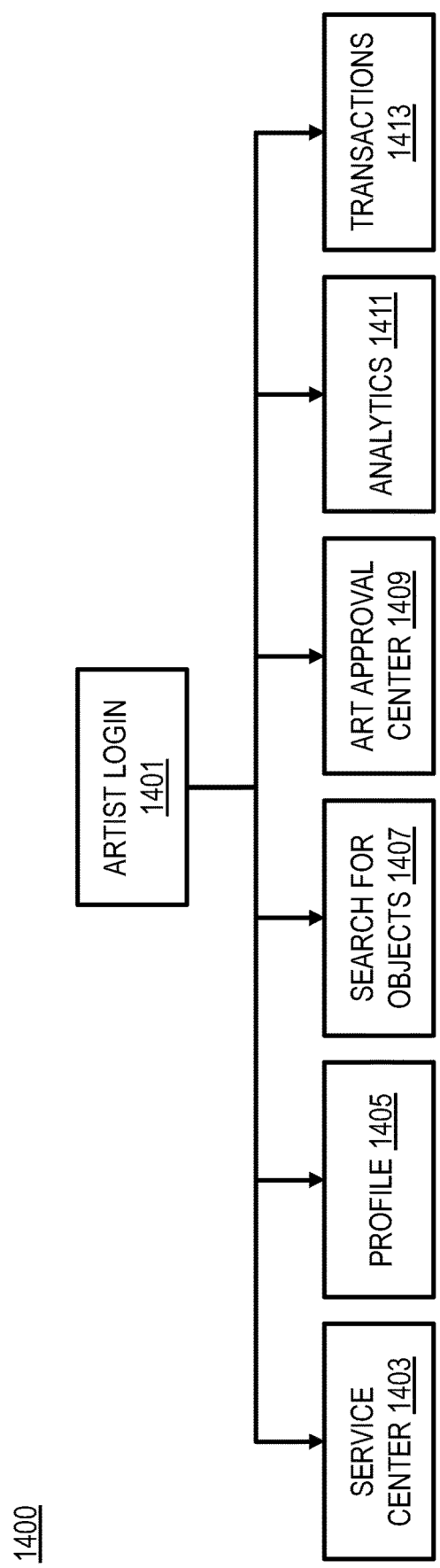
FIG. 14 is a diagram of a process flow for an artist to interact with a digital collectible platform, according to one example embodiment.

FIG. 14 is a diagram of a process flow 1400 for an artist to interact with a digital collectible platform 101, according to one example embodiment. The digital collectible platform 101 provides a user interface for artist login 1401 to initiate the process flow 1300. It is contemplated that the digital collectible platform 101 can use any authentication mechanism (e.g., username/password, multi-factor authentication, etc.) to perform artist login 1401. In one embodiment, once the artist is logged in, the digital collectible platform 101 can present a service center function 1403 and associated user interfaces. The service center function 1403, for instance, enables the artist to view commission requests to create new artwork (e.g., request to commission artwork for an object 103) and request to buy existing artwork from the artist.

In one embodiment, the digital collectible platform 101 also provides a profile function 1405 for the artist to edit the artist's profile information (e.g., stored in artist data 129). The profile function 1405 includes, for instance: (1) a sub-function to add artwork to the artist's profile; (2) a sub-function to edit the artist's biographical information; and (3) a sub-function to a photo or other media of the artist.

In one embodiment, the digital collectible platform 101 also provides a search for objects function 1407 and associated user interfaces for the artist to find an object 103 to depict and an art approval center function 1409. Examples of the functions 1407 and 1409 are described with respect to process 1000 of FIG. 10.

In one embodiment, the digital collectible platform 101 also provides an analytics function 1411 and associated user interfaces for various analytical function such as but not limited to: (1) activity—view activity associated with the artist and related services on the digital collectible platform 101; (2) views—monitor the number views of the artist's profile, artwork, services, etc. on the digital collectible platform 101; (3) market value of artwork—view the dynamic value metric(s) 121 of the objects 103 featuring the artist's artwork; (4) impressions—view the number of impressions of the digital representations 105 of the objects 103; (5) sales—view the sales of the artist's artwork; (6) engagements—view scheduled or proposed artwork commissions; and (7) digital marketing—view digital marketing activities related to the objects 103 featuring the artist's artwork.

In one embodiment, the digital collectible platform 101 also provides a transactions function 1413 for the artist to view transactions in various categories including but not limited to: (1) originals/commission—transactions related to the sale of the artist's original and commissioned artwork; (3) apparel—transactions related to apparel featuring the artist's artwork; (4) digital marketing sales—sales related to the digital representations 105 of the objects 103 featuring the artist's work; (5) physical sales—sales related to the physical objects 103 featuring the artist's work; and (6) limited number of prints—sales of limited prints of the artist's artwork.

Figure 15:
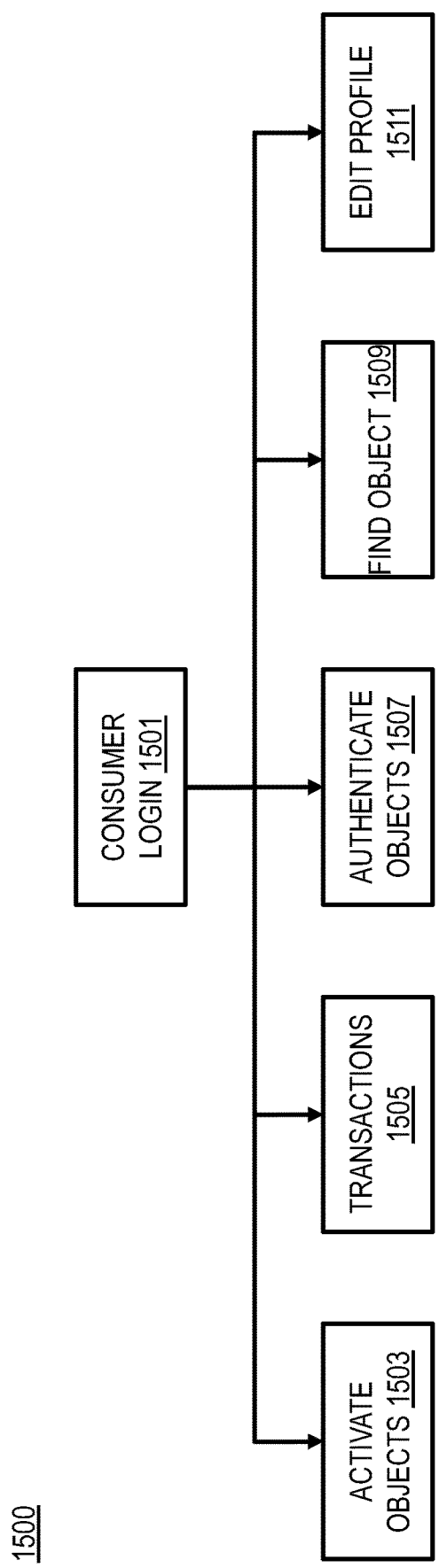
FIG. 15 is a diagram of a process flow for a consumer to interact with a digital collectible platform, according to one example embodiment.

FIG. 15 is a diagram of a process flow 1500 for a consumer to interact with a digital collectible platform 101, according to one example embodiment. A consumer refers, for instance, to a user who owns or wants to buy, sell, or trade objects 103 on the digital collectible platform 101. The digital collectible platform 101 provides a user interface for consumer login 1501 to initiate the process flow 1500. In one embodiment, a consumer refers to a user of the digital collectible platform 101 who buys, sells, or trades the objects 103 and/or related services. It is contemplated that the digital collectible platform 101 can use any authentication mechanism (e.g., username/password, multi-factor authentication, etc.) to perform subject login 1501. In one embodiment, once the consumer is logged in, the digital collectible platform 101 can present a function 1503 to activate object 103 (e.g., digital and/or physical). Activation, for instance, refers to registering the card with the consumer's account to link to a digital representation 105 and to activate the promotions, services, sponsorships, content, etc. associated with the object 103. The activate card function 1503 can also provide functions and user interfaces for using the object 103 (e.g., redeeming items, services, content, etc.) and for gifting the object 103.

In one embodiment, the digital collectible platform 101 also provides a transactions function 1505 and related user interfaces for the consumer to view past purchases or conduct new purchases of objects 103, related services, and/or apparel. The transactions function 1505 also enables the consumer to buy, sell, trade, or gift objects 103, and to view updated value metrics 121 of the objects 103.

In one embodiment, the digital collectible platform 101 also provides a function 1507 to authenticate objects 103. It is contemplated that the digital collectible platform 101 can use any means to authenticate objects 103 to determine whether the object 103 is real or counterfeit/expired/invalid/etc. For example, watermarks and/or any other anti-counterfeiting measures known in the art may applied.

In one embodiment, the digital collectible platform 101 also provides function 1509 to find an object 103. Examples of the find object function 1509 are described with respect to process flow 1200 of FIG. 12 as well as the process 1000 of FIG. 10.

In one embodiment, the digital collectible platform 101 also provides an edit information 1511 for the consumer to edit information about herself/himself. For example, the consumer can add or edit information such as but not limited to contact information, profile picture, and/or billing information as they appear on the digital collectible platform 101.

Figure 16:
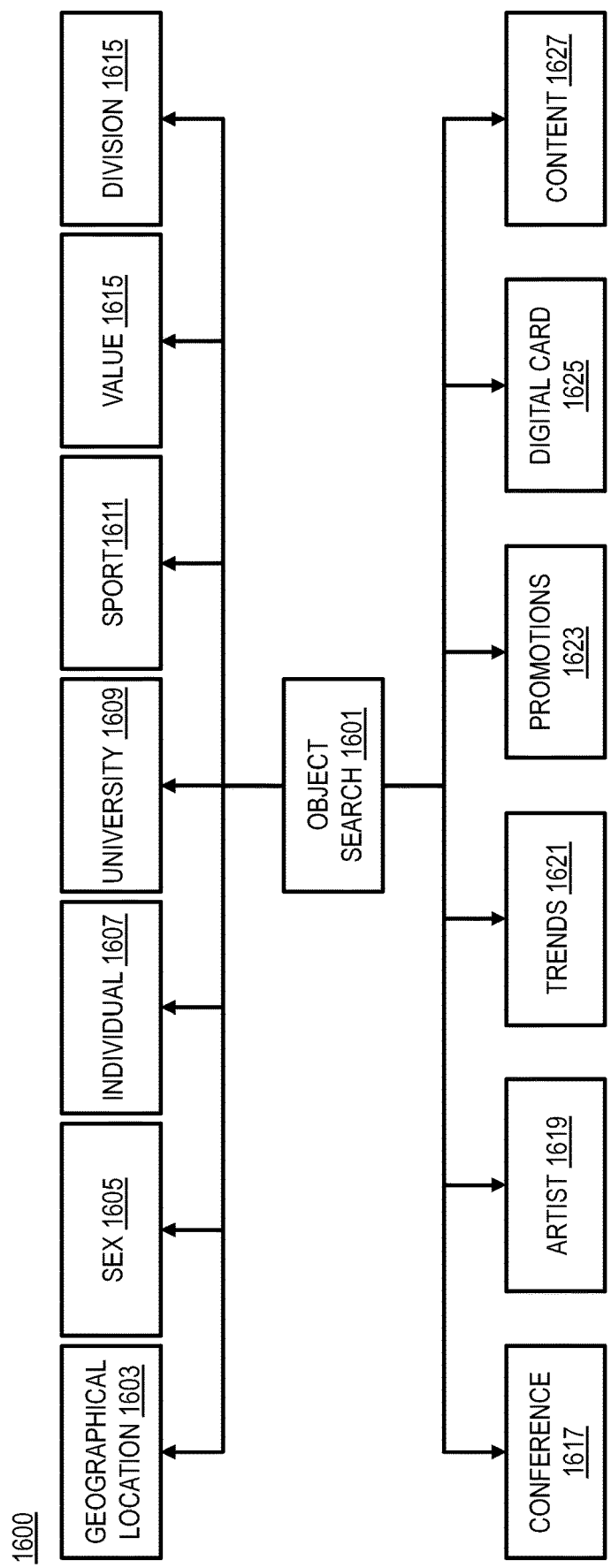
FIG. 16 is a diagram of a process flow for searching for an object or a digital representation of the object on a digital collectible platform, according to one example embodiment.

FIG. 16 is a diagram of a process flow for searching for an object 103 on a digital collectible platform, according to one example embodiment. In one embodiment, the digital collectible platform 101 provides functions and associated user interfaces for searching for objects 103 (e.g., card search function 1601). These object search function 1601 include searching for objects 103 in order to buy, sell, trade, or gift the objects 103. The object search function 1601 can apply search filters such as but not limited to: (1) by geographical location 1603, (2) by sex 1605 of the subject/athlete; (3) by individual 1607; (4) by university 1609; (5) by sport 1611; (6) by value 1613; (7) by division 1615; (8) by conference 1617; (9) by artist 1619; (10) by trends 1621; (11) by promotions 1623; (12) by digital card 1625; and (13) by associated content 1627. It is noted that the example search filters above are provided by way of illustration and not as limitations. It is contemplated that any attribute can be used as a search filter and the search filters can depend on the type of object 103. For example, the attributes of the objects 103 can be domain specific. For example, search filters relevant to trading cards may include but are not limited to make, model, year, mileage, installed equipment, etc. As another example, search filters relevant to animals can include but are not limited to breed, age, fur color, etc.

Returning to FIG. 1, as shown, the system 100 includes the digital collectible platform 101 alone or in combination with the application 135 to provide a digital infrastructure for providing objects 103 with intrinsic value related to associated sponsorship/promotional items according to the various embodiments described herein. In one embodiment, the digital collectible platform 101 includes or is otherwise associated with one or more machine learning models (e.g., neural networks or other equivalent network using algorithms such as but not limited to an evolutionary algorithm, reinforcement learning, or equivalent) for performing functions as discussed with respect to various embodiments described herein.

In one embodiment, the digital collectible platform 101 has connectivity over the communication network 119 to the services platform 113 that provides one or more services 115, one or more content providers 117, and other components of the system 100. By way of example, the services 115 may be third party services and include but is not social networking services, proxy communication services, shopping services, content (e.g., audio, video, images, etc.) management/delivery services, application services, storage services, contextual information determination services, location based services, information based services (e.g., weather, news, etc.), etc.

In one embodiment, the digital collectible platform 101 may be a platform with multiple interconnected components. The digital collectible platform 101 may include multiple servers, intelligent networking devices, computing devices, components, and corresponding software for providing a digital trading card functions according to the various embodiments described herein. In addition, it is noted that the digital collectible platform 101 may be a separate entity of the system 100, a part of the one or more services 115, a part of the services platform 113, or included within components of the UEs 137 or applications 135.

In one embodiment, content providers 117 may provide content or data (e.g., including programming content, broadcast content, streaming content, video on demand content, pay-per-view content, etc.) to the digital collectible platform 101, the services platform 113, the services 115, the UEs 137, and/or the applications 135 executing on the UEs 137. In one embodiment, the content providers 117 may provide content that may aid in digital trading card functions according to the various embodiments described herein. In one embodiment, the content providers 117 may also store content associated with the digital collectible platform 101, services platform 113, services 115, and/or any other component of the system 100. In another embodiment, the content providers 117 may manage access to a central repository of data, and offer a consistent, standard interface to data.

In one embodiment, the UEs 137 may execute software applications 135 to use or access data used and/or generated by the digital collectible platform 101 according to the embodiments described herein. By way of example, the applications 135 may also be any type of application that is executable on the UEs 137. In one embodiment, the applications 135 may act as a client for the digital collectible platform 101 and perform one or more functions associated with providing digital trading card functions alone or in combination with the digital collectible platform 101.

By way of example, the UEs 137 is or can include any type of embedded system, mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UEs 137 can support any type of interface to the user (such as "wearable" circuitry, etc.). In one embodiment, the UEs 137 may be associated with the code reader 131 or include the code reader 131 as a component.

In one embodiment, the communication network 119 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the digital collectible platform 101, services platform 113, services 115, UEs 137, and/or content providers 117 communicate with each other and other components of the system 100 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

The processes described herein for providing a digital collectible platform may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

Figure 17:
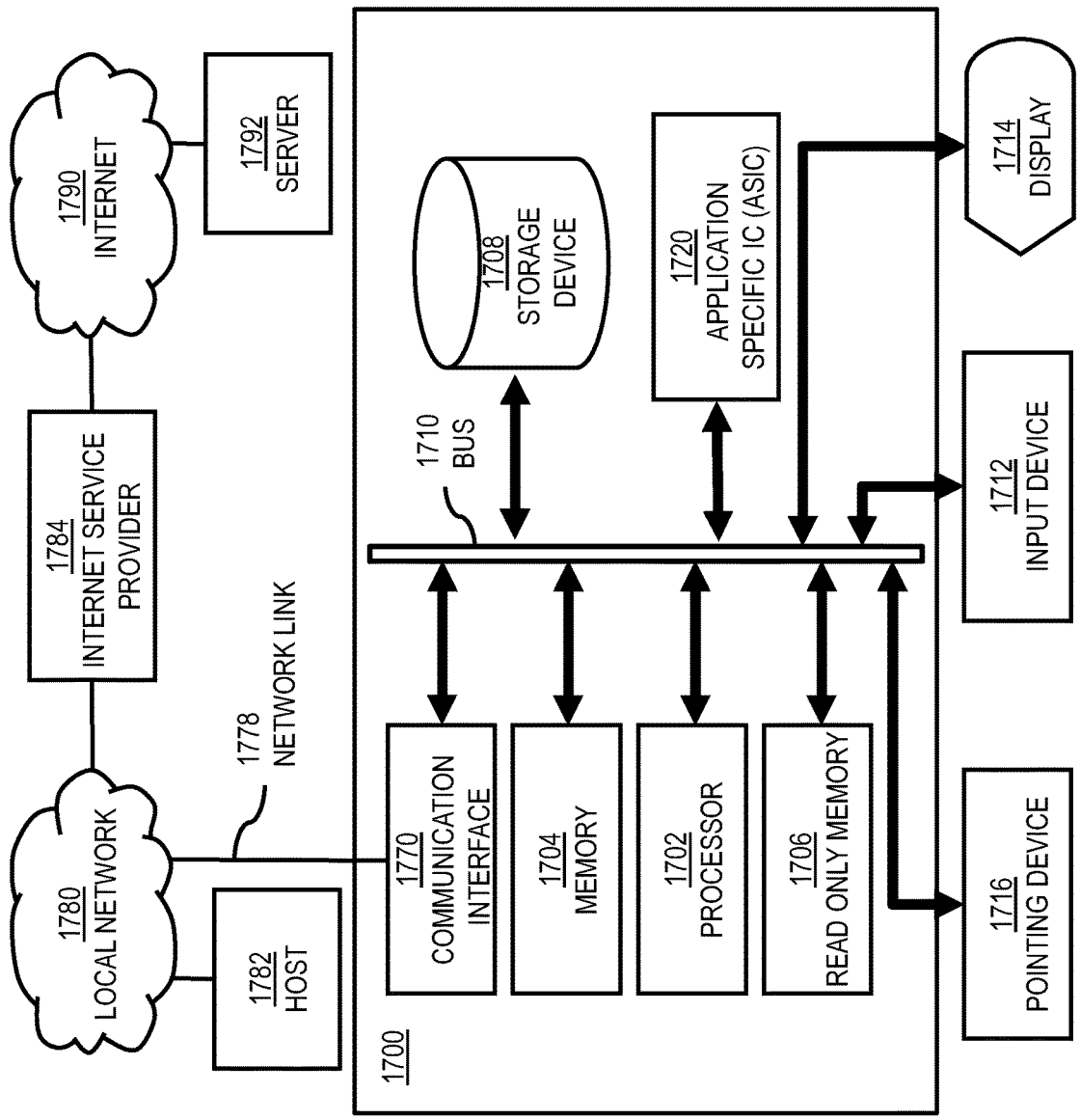
FIG. 17 is a diagram of hardware that can be used to implement an example embodiment of the processes described herein.

FIG. 17 illustrates a computer system 1700 upon which an embodiment of the invention may be implemented. Computer system 1700 is programmed (e.g., via computer program code or instructions) to provide a digital collectible platform as described herein and includes a communication mechanism such as a bus 1710 for passing information between other internal and external components of the computer system 1700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1710 includes one or more parallel conductors of information so that information is transferred quickly among devices coupled to the bus 1710. One or more processors 1702 for processing information are coupled with the bus 1710.

A processor 1702 performs a set of operations on information as specified by computer program code related to providing a digital collectible platform. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1710 and placing information on the bus 1710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1700 also includes a memory 1704 coupled to bus 1710. The memory 1704, such as a random access memory (RAM) or other dynamic storage device, stores information including processor instructions for providing a digital collectible platform. Dynamic memory allows information stored therein to be changed by the computer system 1700. RAM allows a unit of information stored at a location called a memory address to be stored and retrieved independently of information at neighboring addresses. The memory 1704 is also used by the processor 1702 to store temporary values during execution of processor instructions. The computer system 1700 also includes a read only memory (ROM) 1706 or other static storage device coupled to the bus 1710 for storing static information, including instructions, that is not changed by the computer system 1700. Some memory is composed of volatile storage that loses the information stored thereon when power is lost. Also coupled to bus 1710 is a non-volatile (persistent) storage device 1708, such as a magnetic disk, optical disk or flash card, for storing information, including instructions, that persists even when the computer system 1700 is turned off or otherwise loses power.

Information, including instructions for providing a digital collectible platform, is provided to the bus 1710 for use by the processor from an external input device 1712, such as a keyboard containing alphanumeric keys operated by a human user, or a sensor. A sensor detects conditions in its vicinity and transforms those detections into physical expression compatible with the measurable phenomenon used to represent information in computer system 1700. Other external devices coupled to bus 1710, used primarily for interacting with humans, include a display device 1714, such as a cathode ray tube (CRT) or a liquid crystal display (LCD), or plasma screen or printer for presenting text or images, and a pointing device 1716, such as a mouse or a trackball or cursor direction keys, or motion sensor, for controlling a position of a small cursor image presented on the display 1714 and issuing commands associated with graphical elements presented on the display 1714. In some embodiments, for example, in embodiments in which the computer system 1700 performs all functions automatically without human input, one or more of external input device 1712, display device 1714 and pointing device 1716 is omitted.

In the illustrated embodiment, special purpose hardware, such as an application specific integrated circuit (ASIC) 1720, is coupled to bus 1710. The special purpose hardware is configured to perform operations not performed by processor 1702 quickly enough for special purposes. Examples of application specific ICs include graphics accelerator cards for generating images for display 1714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1700 also includes one or more instances of a communications interface 1770 coupled to bus 1710. Communication interface 1770 provides a one-way or two-way communication coupling to a variety of external devices that operate with their own processors, such as printers, scanners and external disks. In general the coupling is with a network link 1778 that is connected to a local network 1780 to which a variety of external devices with their own processors are connected. For example, communication interface 1770 may be a parallel port or a serial port or a universal serial bus (USB) port on a personal computer. In some embodiments, communications interface 1770 is an integrated services digital network (ISDN) card or a digital subscriber line (DSL) card or a telephone modem that provides an information communication connection to a corresponding type of telephone line. In some embodiments, a communication interface 1770 is a cable modem that converts signals on bus 1710 into signals for a communication connection over a coaxial cable or into optical signals for a communication connection over a fiber optic cable. As another example, communications interface 1770 may be a local area network (LAN) card to provide a data communication connection to a compatible LAN, such as Ethernet. Wireless links may also be implemented. For wireless links, the communications interface 1770 sends or receives or both sends and receives electrical, acoustic or electromagnetic signals, including infrared and optical signals, that carry information streams, such as digital data. For example, in wireless handheld devices, such as mobile telephones like cell phones, the communications interface 1770 includes a radio band electromagnetic transmitter and receiver called a radio transceiver. In certain embodiments, the communications interface 1770 enables connection to the communication network 119 for providing a digital collectible platform.

The term computer-readable medium is used herein to refer to any medium that participates in providing information to processor 1702, including instructions for execution. Such a medium may take many forms, including, but not limited to, non-volatile media, volatile media and transmission media. Non-volatile media include, for example, optical or magnetic disks, such as storage device 1708. Volatile media include, for example, dynamic memory 1704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1778 typically provides information communication using transmission media through one or more networks to other devices that use or process the information. For example, network link 1778 may provide a connection through local network 1780 to a host computer 1782 or to equipment 1784 operated by an Internet Service Provider (ISP). ISP equipment 1784 in turn provides data communication services through the public, world-wide packet-switching communication network of networks now commonly referred to as the Internet 1790.

A computer called a server host 1792 connected to the Internet hosts a process that provides a service in response to information received over the Internet. For example, server host 1792 hosts a process that provides information representing video data for presentation at display 1714. It is contemplated that the components of system can be deployed in various configurations within other computer systems, e.g., host 1782 and server 1792.

FIG. 18 illustrates a chip set 1800 upon which an embodiment of the invention may be implemented. Chip set 1800 is programmed to provide a digital collectible platform as described herein and includes, for instance, the processor and memory components described with respect to FIG. 17 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1800 includes a communication mechanism such as a bus 1801 for passing information among the components of the chip set 1800. A processor 1803 has connectivity to the bus 1801 to execute instructions and process information stored in, for example, a memory 1805. The processor 1803 may include one or more processing cores with each core configured to perform independently. A multi-core processor enables multiprocessing within a single physical package. Examples of a multi-core processor include two, four, eight, or greater numbers of processing cores. Alternatively or in addition, the processor 1803 may include one or more microprocessors configured in tandem via the bus 1801 to enable independent execution of instructions, pipelining, and multithreading. The processor 1803 may also be accompanied with one or more specialized components to perform certain processing functions and tasks such as one or more digital signal processors (DSP) 1807, or one or more application-specific integrated circuits (ASIC) 1809. A DSP 1807 typically is configured to process real-world signals (e.g., sound) in real time independently of the processor 1803. Similarly, an ASIC 1809 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1803 and accompanying components have connectivity to the memory 1805 via the bus 1801. The memory 1805 includes both dynamic memory (e.g., RAM, magnetic disk, writable optical disk, etc.) and static memory (e.g., ROM, CD-ROM, etc.) for storing executable instructions that when executed perform the inventive steps described herein to provide a digital collectible platform. The memory 1805 also stores the data associated with or generated by the execution of the inventive steps.

Figure 19:
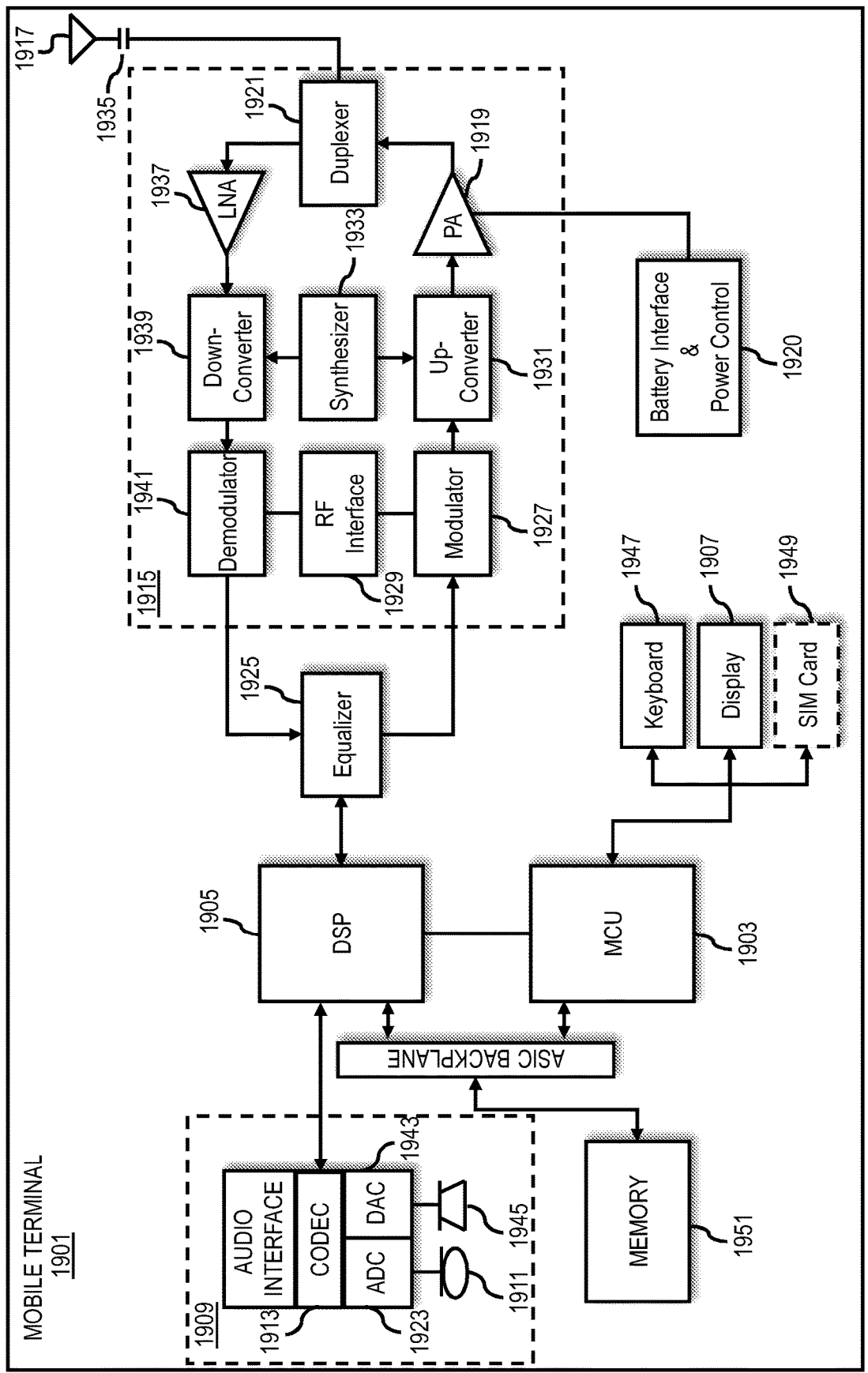
FIG. 19 is a diagram of a terminal that can be used to implement an example embodiment of the processes described herein.

FIG. 19 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1903, a Digital Signal Processor (DSP) 1905, and a receiver/transmitter unit including a microphone gain control unit and a speaker gain control unit. A main display unit 1907 provides a display to the user in support of various applications and mobile station functions that offer automatic contact matching. An audio function circuitry 1909 includes a microphone 1911 and microphone amplifier that amplifies the speech signal output from the microphone 1911. The amplified speech signal output from the microphone 1911 is fed to a coder/decoder (CODEC) 1913.

A radio section 1915 amplifies power and converts frequency in order to communicate with a base station, which is included in a mobile communication system, via antenna 1917. The power amplifier (PA) 1919 and the transmitter/modulation circuitry are operationally responsive to the MCU 1903, with an output from the PA 1919 coupled to the duplexer 1921 or circulator or antenna switch, as known in the art. The PA 1919 also couples to a battery interface and power control unit 1920.

In use, a user of mobile station 1901 speaks into the microphone 1911 and his or her voice along with any detected background noise is converted into an analog voltage. The analog voltage is then converted into a digital signal through the Analog to Digital Converter (ADC) 1923. The control unit 1903 routes the digital signal into the DSP 1905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1925 for compensation of any frequency-dependent impairments that occur during transmission though the air such as phase and amplitude distortion. After equalizing the bit stream, the modulator 1927 combines the signal with a RF signal generated in the RF interface 1929. The modulator 1927 generates a sine wave by way of frequency or phase modulation. In order to prepare the signal for transmission, an up-converter 1931 combines the sine wave output from the modulator 1927 with another sine wave generated by a synthesizer 1933 to achieve the desired frequency of transmission. The signal is then sent through a PA 1919 to increase the signal to an appropriate power level. In practical systems, the PA 1919 acts as a variable gain amplifier whose gain is controlled by the DSP 1905 from information received from a network base station. The signal is then filtered within the duplexer 1921 and optionally sent to an antenna coupler 1935 to match impedances to provide maximum power transfer. Finally, the signal is transmitted via antenna 1917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1901 are received via antenna 1917 and immediately amplified by a low noise amplifier (LNA) 1937. A down-converter 1939 lowers the carrier frequency while the demodulator 1941 strips away the RF leaving only a digital bit stream. The signal then goes through the equalizer 1925 and is processed by the DSP 1905. A Digital to Analog Converter (DAC) 1943 converts the signal and the resulting output is transmitted to the user through the speaker 1945, all under control of a Main Control Unit (MCU) 1903—which can be implemented as a Central Processing Unit (CPU) (not shown).

The MCU 1903 receives various signals including input signals from the keyboard 1947. The keyboard 1947 and/or the MCU 1903 in combination with other user input components (e.g., the microphone 1911) comprise a user interface circuitry for managing user input. The MCU 1903 runs a user interface software to facilitate user control of at least some functions of the mobile station 1901 to provide a digital collectible platform. The MCU 1903 also delivers a display command and a switch command to the display 1907 and to the speech output switching controller, respectively. Further, the MCU 1903 exchanges information with the DSP 1905 and can access an optionally incorporated SIM card 1949 and a memory 1951. In addition, the MCU 1903 executes various control functions required of the station. The DSP 1905 may, depending upon the implementation, perform any of a variety of conventional digital processing functions on the voice signals. Additionally, DSP 1905 determines the background noise level of the local environment from the signals detected by microphone 1911 and sets the gain of microphone 1911 to a level selected to compensate for the natural tendency of the user of the mobile station 1901.

The CODEC 1913 includes the ADC 1923 and DAC 1943. The memory 1951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1951 may be, but not limited to, a single memory, CD, DVD, ROM, RAM, EEPROM, optical storage, or any other non-volatile or non-transitory storage medium capable of storing digital data.

An optionally incorporated SIM card 1949 carries, for instance, important information, such as the cellular phone number, the carrier supplying service, subscription details, and security information. The SIM card 1949 serves primarily to identify the mobile station 1901 on a radio network. The card 1949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A system comprising:
 a physical tag configured with a machine readable code, wherein the machine readable code associates the physical tag to an object;
 a code reader configured to read the machine readable code from the physical tag to determine an object identifier associated with the object;
 a trained machine learning model configured to compute a dynamic value metric based on computing one or more input features from attribute data associated with the object identifier and queried from one or more databases, and feeding the one or more input features to the trained machine learning model, wherein the dynamic value metric is updated based on automatic monitoring of the attribute data by the processor to determine that one or more changes to the attribute data has occurred, and wherein the trained machine learning model has model parameters adjusted to make an accurate prediction of the dynamic value metric; and
 an application configured to present a user interface displaying a digital representation of the object comprising the dynamic value metric.

2. The system of claim 1, wherein the physical tag is a sticker, a label, a plate, or a combination thereof configured to be affixed to the object.

3. The system of claim 1, wherein the physical tag is printed onto a surface of the object.

4. The system of claim 1, wherein the processor is further configured to determine an access right to content based on the object identifier, a registration of the object identifier to a user account, or combination thereof.

5. The system of claim 4, wherein the content includes a restricted social media feed, a restricted social media community, or a combination thereof.

6. The system of claim 1, wherein the object is configured to be part of a collection of a plurality of objects, and wherein the access right is determined based on a completeness of the collection meeting a threshold completeness level.

7. The system of claim 6, wherein the completeness of the collection is determined based on the object identifier, one or more other object identifiers associated with the plurality of objects, or a combination thereof being registered to a user account.

8. The system of claim 1, wherein the processor is further configured to determine a collaborative link associated with the object identifier, and wherein the application is further configured to present the collaborative link in the user interface.

9. The system of claim 8, wherein the dynamic value metric is further based on detecting that the collaborative link was accessed.

10. The system of claim 8, wherein the collaborative link associates a first content creator associated with the object identifier with a second content creator associated with object identifier.

11. The system of claim 1, wherein the processor is further configured to query for one or more task data records indicating a completion status of one or more tasks associated with the object, and wherein the dynamic value metric is computed further based on the one or more object data records.

12. The system of claim 1, wherein the one or more sponsorship data records are associated with one or more redeemable items, one or more redeemable services, or a combination thereof, and wherein the processor is further configured to track a redemption of the one or more redeemable items, the one or more redeemable services, or a combination thereof.

13. The system of claim 12, wherein the processor is further configured to update the dynamic value metric based on the redemption of the one or more redeemable items, the one or more redeemable services, or a combination thereof.

14. The system of claim 1, wherein the apparatus is further configured to determine content from one or more content providers associated with the trading card, and wherein the application is further configured to retrieve the content from one or more content management systems of the one or more content providers and to display the content in the user interface.

15. The system of claim 14, wherein the content is displayed in a user interface element that is rendered within the digital representation of the object.

16. The system of claim 1, wherein the application is further configured to retrieve an artistic representation of the object and to present the artistic representation of the object as the digital representation of the object.

17. The system of claim 16, wherein the processor is further configured to query for one or more artist data records associated with the artistic representation, and wherein the dynamic value metric is computed further based on the one or more artist data records.

18. The system of claim 1, wherein the machine readable code includes a barcode, a quick response (QR) code, a radio frequency identification (RFID) chip, or a combination thereof.

* * * * *